United States Patent
Itoh et al.

(10) Patent No.: US 6,763,927 B2
(45) Date of Patent: Jul. 20, 2004

(54) CONVEYING APPARATUS, A ROLLER CONVEYOR SYSTEM AND A CONVEYOR ASSEMBLY

(75) Inventors: Kazuo Itoh, Kasai (JP); Tatsuhiko Nakamura, Hyogo (JP)

(73) Assignee: Itoh Electric Company Limited (JP)

( * ) Notice: Subject to any disclaimer, the term of this patent is extended or adjusted under 35 U.S.C. 154(b) by 0 days.

(21) Appl. No.: 10/293,750

(22) Filed: Nov. 13, 2002

(65) Prior Publication Data

US 2003/0168320 A1 Sep. 11, 2003

Related U.S. Application Data

(63) Continuation-in-part of application No. 10/091,851, filed on Mar. 6, 2002.

(30) Foreign Application Priority Data

Mar. 22, 2002 (JP) ........................................ 2002-082137

(51) Int. Cl.[7] .............................................. B65G 47/10
(52) U.S. Cl. ............... 198/370.1; 198/809; 198/370.08; 198/463.3
(58) Field of Search ......................... 198/370.1, 370.08, 198/809, 463.3

(56) References Cited

U.S. PATENT DOCUMENTS 4,561,820 A * 12/1985 Matheny, III et al. ...... 414/331
4,850,471 A * 7/1989 Annas, Sr. et al. ...... 198/349.3
4,962,841 A * 10/1990 Kloosterhouse ............. 198/372
5,582,282 A * 12/1996 Focke et al. ............. 198/347.1
5,609,236 A * 3/1997 Neukam ................... 198/370.1
5,727,674 A * 3/1998 St. John et al. ............. 198/809
5,743,375 A   4/1998 Shyr
5,971,132 A * 10/1999 Bonnet ................... 198/370.07
6,223,880 B1 * 5/2001 Caspi et al. ............. 198/346.2
6,471,044 B1 * 10/2002 Isaacs et al. ................ 198/809
2002/0134646 A1   9/2002 Itoh

FOREIGN PATENT DOCUMENTS

FR         2 327 940      5/1977
WO     WO 00 32504      6/2000

* cited by examiner

Primary Examiner—Christopher P. Ellis
Assistant Examiner—Rashmi Sharma
(74) Attorney, Agent, or Firm—Wood, Phillips, Katz, Clark & Mortimer

(57) ABSTRACT

A conveying apparatus is composed of a motor-installed roller (2), cams (3), a rotation axis deflector (4), a drive pulley (5), a driven pulley (6), an endless belt (7), a flat support (8) and a spring (9). The roller (2) and the deflector (4) take their position enclosed with the belt (7), and the shaft (15) of the roller (2) is operatively connected by the deflector (4) to the drive pulley (5). A sleigh-shaped top plate (25) of the support (8) intervenes between the roller (2) and the back surface of belt (7), and when the cylindrical casing (12) of this roller rotates, the cams (3) will also rotate to raise the support (8) and lift the upper transporting path of the belt (7), so that the apparatus is rendered so smaller in size that it can be used as a cross transporter adapted for installation in any desired space.

25 Claims, 19 Drawing Sheets

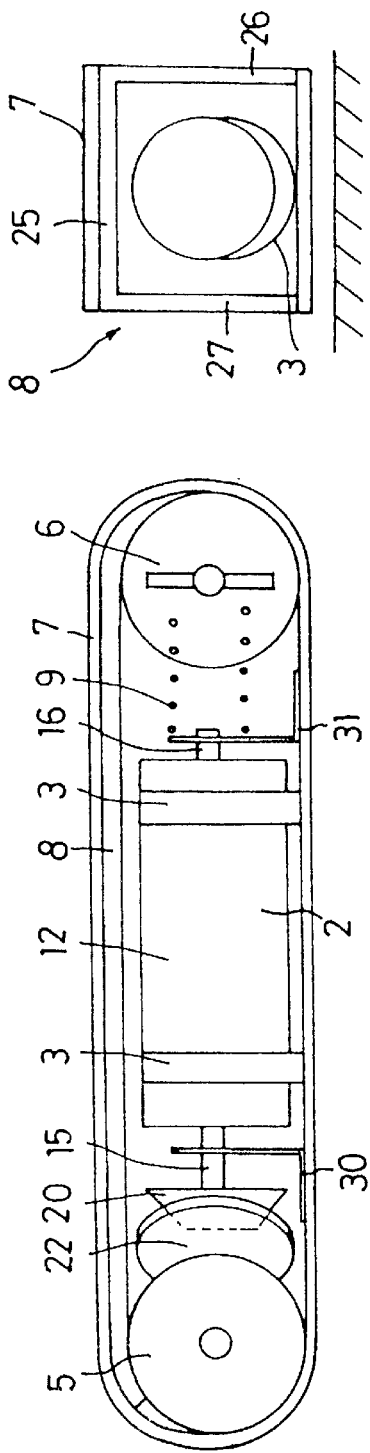
Fig.2A
Fig.2B
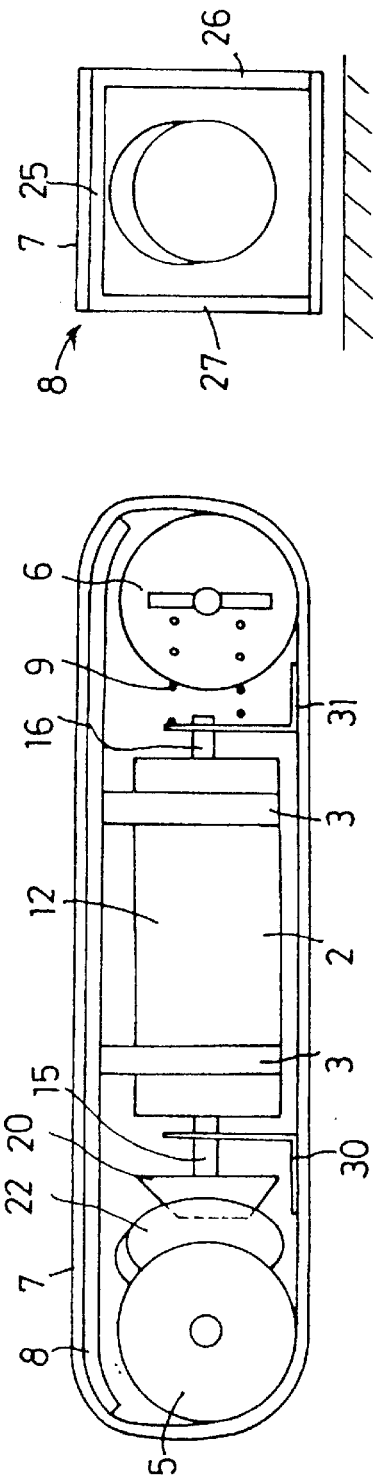
Fig.2C
Fig.2D

CONVEYING APPARATUS, A ROLLER CONVEYOR SYSTEM AND A CONVEYOR ASSEMBLY

This application is a continuation in part of Ser. No. 10/091,851 filed Mar. 6, 2002.

BACKGROUND OF THE INVENTION

1. Field of the Invention

The present invention relates to a conveying apparatus for installation in a conveyor line that is repeatedly unloaded of or loaded with articles.

2. Description of Related Art

Usually, conveyor lines are incorporated in various assembling manufacture lines or at distribution stations wherever articles are successively transported along the lines or within the stations. For example, a number of conveyor lines may typically be arranged lengthwise and crosswise in each distribution station, with some transverse conveyors called "cross feeders" being placed at given positions. Such cross feeders will operate to transfer the articles from one conveyor line to another so as to forward them to respective destinations.

Generally, each cross feeder is composed of a transporting mechanism and a lifting mechanism. The top of the transporting mechanism takes its normal position below the article-supporting surface of the longitudinal conveyor line, so as not to interfere with any article being moved on and along this conveyor line. A sensor or the like device will detect the destination of every article so that a stopper is driven to catch and temporarily hold the thus selected article on the cross feeder. Thereafter, the lifting mechanism will be turned on to raise the transporting mechanism above the article-supporting surface of the longitudinal conveyor line. The transporting mechanism will subsequently be switched on so that the selected article thus lifted moves onto an adjacent conveyor line.

One of the prior apparatuses known in the art is the "motor installed-roller" having a cylinder that encloses therein a motor accompanied by a speed reducer. This prior art apparatus is for use as the lifting mechanism in the cross feeder (see Patent Laying-Open Gazette H. 6-312832).

FIG. 19 recites the cross feeder disclosed in this Gazette H. 6-312832. This cross feeder 100 is composed of a transporting mechanism 101 and a lifting mechanism 102, wherein motor-installed rollers 110 and 105 serve as principal parts of the respective mechanisms 101 and 102.

The transporting mechanism 101 constituting the cross feeder shown in FIG. 19 has an idle roller 111 and some guide rollers 112, in addition to the motor-installed roller 110. Each of two belts 115 lying in parallel with each other engages with those motor-installed roller 110, idle roller 111 and guide rollers 112, to thereby form a loop around them.

On the other hand, the motor-installed roller 105 of the lifting mechanism 102 has rings 106 fixed on its outer peripheral zones. A tie link 108 has one end operatively connected by a pin 107 to the ring 106, with the tie link's other end adjoined to the transporting mechanism 101.

As will be seen in FIG. 19, the transporting mechanism 101 will remain above the transporting surface of the conveyor line so long as the pin 107 is kept at its uppermost position. When the transporting mechanism 101 is subsequently retracted below the said surface of conveyor line, the motor-installed roller 105 will spin a quarter of one rotation to lower this mechanism synchronously with the pin 107.

The cross feeder 100 of FIG. 19 is for use in combination with a roller conveyor line such that each belt 115 of the feeder does intervene between two adjacent rollers included in the conveyor line.

When the conveyor line is loaded with or unloaded of an article, the motor-installed roller 105 in the lifting mechanism 102 will operate at first. This motion is made to lift the transporting mechanism 101 until the upper traveling path of each belt 115 protrudes up between the constituent rollers of the conveyor line so as to raise the article above it. Next, the motor-installed roller 110 in the transporting mechanism 101 will be switched on to circulate the belts 115 over and around its rollers, thereby removing the article from the conveyor line.

SUMMARY OF THE INVENTION

As described above, each of the two parallel belts 115 of the prior art cross feeder is intended for insertion in between the two adjacent rollers of a conveyor. It is however to be noted that a distance between the adjacent rollers is not necessarily constant but largely varies between the types of roller conveyors. Thus, it has been difficult in some cases to properly dispose each belt among the rollers.

Further, the prior art cross feeder is composed of two discrete sections, that is the transporting and lifting mechanisms 101 and 102. This structure has rendered the feeder considerably large in its overall size, to such an extent as possibly disabling the cross feeder to be installed in a requisite portion of the conveyor line.

An object of the present invention made in view of the drawbacks inherent in the prior art is therefore to develop and provide a transversely conveying apparatus rendered smaller in size and capable of installation into any narrow space.

A conveying apparatus provided herein to achieve the object does include a motor-installed device having a casing, a motor accommodated in the casing and a shaft. This casing is capable of rotating relative to and about the shaft, and the shaft is also capable of rotating about a rotation axis so as to produce a torque. The apparatus further includes at least one cam fixed on the casing, an endless member, a drive member for driving the endless member, a terminal member disposed opposite to the drive member, and a deflector for converting the rotation axis to a transverse axis for the drive member. The transverse axis extends crosswise to the rotation axis so as to transmit the torque to the drive member. In this apparatus, the drive member and the terminal member are spanned with the endless member that substantially encloses the motor-installed device. The apparatus still further includes a support that is interposed between the casing and the endless member so as to be capable of contacting both the at least one cam and the endless member. When the shaft rotates relative to the casing standing stationary, the torque will be applied to the drive member so as to cause the endless member to travel in a circulating manner. If contrarily the casing rotates together with the cam relative to the shaft standing still, then the cam will raise or lower the support so as to expand outwards or retract inwards a portion of the endless member.

Here, "the transverse axis extending crosswise to the rotation axis" includes an axis not actually crossing and not parallel to the rotation axis, as well as an axis actually crossing the rotation axis.

In the conveying apparatus from the above-described aspect of the invention, all the principal parts take their position to be enclosed by the endless member. The apparatus thus rendered much smaller in its overall size as compared with the prior art ones can now be incorporated in any desired space, broad or narrow.

Preferably, the endless member noted above may be a belt and both the drive and terminal members may be a pulley. The endless member may otherwise be a chain cooperating with sprockets employed as the drive and terminal members.

Also preferably, the terminal member is movable towards and away from the drive member. Thus, distance between the rotation axes of those drive and terminal members is variable so that tension appearing in and along the endless member stands constant, not affected by the ascending or descending movement of the flat support.

It also is desirable to provide the apparatus with a braking means that will force the casing not to spin but to stand still. In this case, the endless member will start to travel in a circulating manner upon stoppage of the casing braked by said means, as the casing and the shaft rotate relative to each other.

Preferably the motor-installed device is a motor-installed cylinder, the casing is a cylindrical casing, a speed reducer accompanying the motor is further accommodated in the casing, and at least one end of the shaft protrudes outwards from at least one end of the casing. In other words, the motor-installed device is a motor-installed cylinder having a cylindrical casing and a shaft, the cylindrical casing accommodates the motor and a speed reducer accompanying the motor, at least one end of the shaft protrudes outwards from at least one end of the casing, and the cylindrical casing and the shaft are rotatable relative to each other.

The conveying apparatus just summarized above uses a motor-installed cylinder as a motor-installed device. A motor-installed cylinder, also called "a motor-installed roller", or "a motorized roller", is made of a cylinder accommodating a motor and a speed reducer. In the cylinder, rotational force of the motor is transmitted to the cylindrical casing through the reducer.

A conveying apparatus also provided herein includes a motor-installed device having a casing, a motor accommodated in the casing and a shaft, with these casing and shaft being capable of rotating relative to each other and about a rotational axis. The apparatus further includes a deflecting mechanism for converting the rotational axis to a further rotational axis, viz., a transverse transmission axis, a power inputting means, a transverse transporting means, and a lifting means. The transporting means transports an article axially of the motor-installed device when and while the power inputting means is energized to rotate. The lifting means for raising and lowering the transporting means is capable of being selectively and operatively connected to one of the casing and the shaft of said device, with the other of them being simultaneously connected through the deflecting mechanism to the power inputting means. Thus, when said one of these cylindrical casing and shaft of said motor-installed device is turned on to rotate, the lifting means will be driven to raise or lower the transporting means. With the other of these casing and shaft of said device being turned on to rotate, the transporting means will be activated by the power inputting means through the deflecting mechanism so as to transport the article.

In the conveying apparatus just summarized above, the motor-installed cylindrical device has such a casing and such a shaft that rotate relative to each other so that the lifting means can operate in unison with either of them, viz., the casing or the shaft. The lifting means may include a cam, a crank and/or a linkage, all constructed to raise and lower the transporting means. The conveying apparatus has such a deflecting mechanism as switching over the rotational axes from one to another and vise versa. The conveying apparatus has also the transporting means for moving the article along the axis of said motor-installed device, in response to rotation of the power inputting means. When one of the casing or the shaft (e.g., the former) of said motor-installed device is in such an operative connection as noted just above, the other of those casing and shaft (e.g., the latter) is in engagement with the power inputting means, through the deflecting mechanism. A roller conveyor, a belt conveyor or the like may be employed as the transporting means.

When the motor within the motor-installed device is turned on, the cam type raising means will operate to lift the transporting means above the transportation level of the conveyor line. Simultaneously, a torque will be imparted to the power inputting means through the deflecting mechanism so that the transporting means then operates to move the article away from the conveyor line. In other words, the transporting means will be driven by the power inputting means and then having been activated will transport the article along the axis of the motor-installed cylindrical device.

Preferably, the conveying apparatus may include a resisting member or members working against rotation either or both of the casing and the shaft. Such resisting members may have each a brake causing the casing or shaft not to spin at any small angle but to temporarily stand quite still.

In detail, the present conveying apparatus has the resisting member that will resist rotation of the casing or the shaft of the motor-installed cylindrical device. Since these casing and shaft are capable of rotating relative to each other, a torque will be imparted to one of them if and when the other is braked, with the torque being consequently transmitted to the lifting means or to the deflecting mechanism.

Also preferably, the conveying apparatus may include both the casing-resisting and shaft-resisting members that work against the casing and the shaft, respectively. One of such resisting members may always apply a resistance to rotation of the casing or shaft, while the shaft or casing being resisted by the other resisting member temporarily and only tinder certain conditions.

In detail, in the conveying apparatus including both the casing-resisting and shaft-resisting members, the casing and shaft of the motor-installed device can be braked individually. Because one of these resisting members always applies a permanent resistance to one of the casing or shaft, while the other of them being resisted by the other resisting member under certain conditions only, the motor temporarily actuated will impart a torque to said other one of the casing or shaft, to drive either one of the lifting and transporting means. Once the other resisting member is actuated, one of the casing and shaft will be caused into its stationary state, and the other of them having been suffering from the permanent resistance will consequently be forced into rotation to drive the other one of the lifting and transporting means.

It is desirable that the resisting member for the transporting means is of the type always exerting resistance against it.

Preferably, casing-resisting member may be pressed on the casing by a resilient part or parts such as a spring, a rubber piece or the like, thus simplifying structure and manufacture of said member. The spring may be a coiled spring, a leaf spring or any one of the known types of spring.

The lifting means may preferably include a cam that will simplify structure and manufacture of this member.

The cam in operative connection with the shaft of motor-installed cylindrical device may preferably be guided only in a horizontal direction so as to take a position where the shaft is forced tip and down. Such a shaft's vertical movement caused by the cam will in turn raise and lower the transporting means in the present conveying apparatus.

Preferably, the cam may be supported simply on a sliding member that is displaceable only in horizontal direction.

The deflecting mechanism may be composed principally of a crossed belt, more specifically, a quarter-twisted belt, that will simplify this mechanism in structure for reversibly switching over the working rotational axes from one to another.

The transporting means may preferably be composed of a plurality of rotors rotating synchronously, and at least one of them may function as the power inputting means. Such a structure renders it simple and easy to manufacture both the rotors and inputting means.

Preferably, the motor-installed device may substantially consist of a cylinder incorporating in the casing the motor and a reducer and the shaft protruding sideways from and rotating relative to the cylinder, thereby rendering the present apparatus more compact.

From still another aspect of the present invention, it provides a conveying apparatus including a motor-installed device having a casing, a motor accommodated in the casing and a shaft, with the casing and the shaft being capable of rotating relative to each other and about a rotational axis. The apparatus further include a cam, a deflecting mechanism for converting the rotational axis to a further rotational axis, a power inputting means and a transverse transporting means. The transporting means transports an article axially of the motor-installed device when and while the power inputting means is energized to rotate. The apparatus still further includes a casing-resisting member for always resisting against the casing and a shaft-resisting member for temporarily resisting the shaft when the shaft is at its given angular position. Thus, this apparatus is constructed such that the cam is in an operative connection with the shaft in the motor-installed device, with the casing thereof being operatively connected to the power-inputting means through the deflecting mechanism, so that by energizing the motor, the cam will rotate along with the shaft to raise and lower the transporting means. At the given angular position of the shaft, the shaft-resisting member will impart resistance to this shaft so as to force the casing into rotation against the casing-resisting member and to thereby cause a transporting movement of the transporting means due to a power transmitted through the deflection mechanism and power-inputting means.

As just summarized above, the conveying apparatus in this mode of the present invention does include motor-installed device, the cam, the deflection mechanism, the power-inputting means, the transporting means, the casing-resisting member and the shaft-resisting member. The shaft of said motor-installed device operatively communicate with the cam, with the casing-resisting member operatively communicating with the power-inputting means through the deflection mechanism. The casing-resisting member and the shaft-resisting member in this apparatus are effective to apply resistance to the casing and the shaft of said motor-installed device, respectively and individually.

Between the two resisting members, the casing-resisting one is made as a permanently resisting member for the casing. So long as the motor rotates the casing continues to suffer from a strong resistance, thereby forcing the shaft to spin about its own axis as a result of reaction to this resistance. This means that with the motor being turned on, the shaft will start to spin at first, simultaneously causing rotation of the cam in order to raise the transporting means.

The other resisting member that is the shaft-resisting one is designed to and will actually work to resist rotation of the shaft only at the given angle thereof, whereby the casing is forced against the casing-resisting member into rotation to drive the transporting means by and through the deflecting mechanism and power-inputting means.

The cam may preferably be guided only in a horizontal direction so as to take a position where the shaft is forced up and down. Such a shaft's vertical movement caused by the cam will in turn raise and lower the transporting means in the conveying apparatus.

From another aspect, the present invention provides a roller conveyor system including parallel rotating rollers and any one type of the conveying apparatuses summarized above, wherein the latter is interposed between any appropriate or desired two of these rollers.

In the system of such an arrangement, articles can be taken out of or be fed onto a conveyor line.

From still another aspect, the present invention provides a roller conveyor system including in addition to a conveyor line of parallel rotating rollers a conveying apparatus that is interposed between any appropriate or desired two of these rollers.

Also in this system constructed, the articles can likewise be taken out of or be fed onto the conveyor line.

From further still another aspect, the apparatus is driven with an independent power source driving it to ascend above and descend below the level of said rollers in order to convey articles transversely of a conveyor line.

Also in this system constructed, the articles can likewise be taken out of or be fed onto the conveyor line smoothly.

From yet still another aspect, the present invention provides a conveyor assembly in which a number of conveyor units are arranged in series to form a conveyor line. In this conveyor assembly, any one type of the conveying apparatuses summarized above is interposed between any two of the adjacent conveyor units, also enabling the articles to be taken out of or fed onto the conveyor line.

BRIEF DESCRIPTION OF THE DRAWINGS

FIG. 2A is a longitudinal and vertical cross section of the apparatus is shown in FIG. 1, with the flat support being at its lowered home position;

FIG. 2B is a transverse and vertical cross section of the apparatus shown in FIG. 1, with its flat support being at the home position;

FIG. 2C is a longitudinal and vertical cross section of the apparatus also shown in FIG. 1, but with the flat support being at its raised operative position;

FIG. 2D is a transverse and vertical cross section of the apparatus shown in FIG. 1, with its flat support being at the operative position;

DESCRIPTION OF THE PREFERRED EMBODIMENTS

Figure 1:
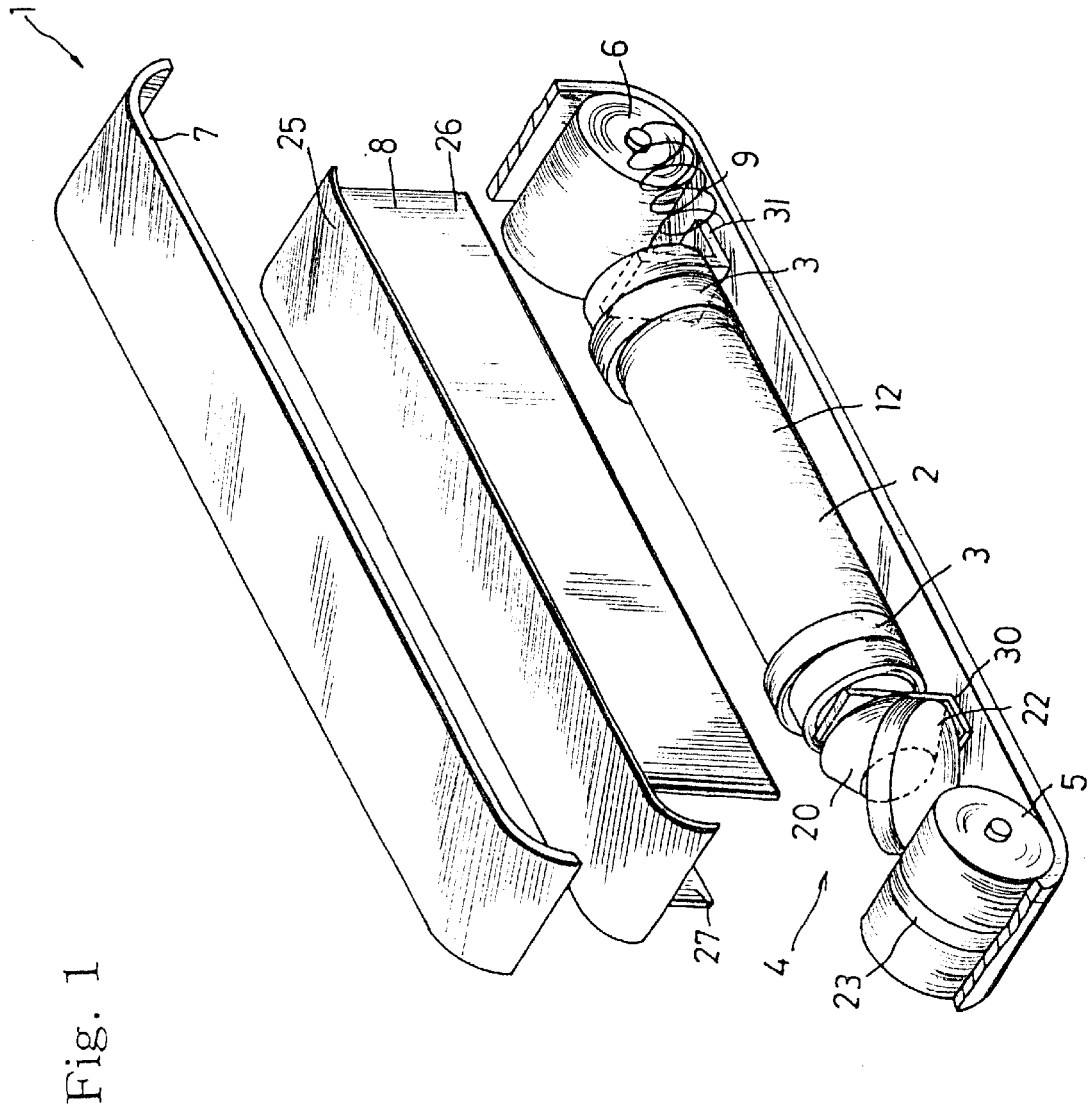
FIG. 1 is an exploded perspective view of a conveying apparatus provided in a first embodiment of the present invention and having a flat support built therein.

Now a first embodiment of the invention will be described at first referring to FIGS. 1 to 3.

The reference numeral 1 in the drawing figures denotes a conveying apparatus or apparatuses. Each apparatus includes a motor-installed roller (viz., a motor-installed cylindrical device) 2, cams 3 and a deflector 4 for changing the directions of rotation axes one to the other. The apparatus further includes a drive pulley (serving as the self-spinning drive member) 5, a driven pulley (as the terminal member) 6, and endless belt 7, a flat support 8 and a spring 9.

The motor-installed roller 2 is available on the market and may for instance be a "power moller", that is the trademark of one type products sold by the Ito Electrical Industries Co., Ltd. Its cylindrical casing 12 holds therein a motor (not shown) and a speed reducer (not shown) substantially consisting of a planetary gear train. Opposite ends 15 and 16 of a shaft protrude sideways from the facing ends of the cylindrical casing 12. The motor-installed rollers 2 are employed as the constituent rollers in a usual type roller conveyor system, with the shaft's ends 15 and 16 being fixed on the frame of said conveyor system. An electric current supplied to the motor will drive and rotate the cylindrical casing 12 enclosing this motor. The motor-installed roller 2 is constructed such that power supply to the motor causes the casing to spin, if the shaft ends 15 and 16 are restrained from rotation. In other words, due to power supply to the motor, the casing 12 does in one occasion rotate relative to the shaft of the motor-installed roller 2. This means that the shaft ends 15 and 16 will however be forced to rotate in another occasion that the casing 12 is prevented from spinning about its axis.

The disc-shaped cams 3, the number of them being two (2) herein, are rigidly and firmly secured on the outer periphery of cylindrical casing 12 of motor-installed roller 2. The center of each cam 3 is offset from that of the casing 12 so that the former will make an eccentric rotation when the latter spins.

The deflector 4 for changing rotation axes is constructed such that rotation of one member about its axis is transmitted to the other member, causing it to spin about the other axis intersecting the first-mentioned axis. In detail, this deflector 4 causes the rotation axis of the output side member to be perpendicular to that of the input side member. In the present embodiment, a bevel friction wheel 20, an intermediate friction wheel 22 and an annular groove 23 formed in the driving pulley 5 do cooperate to constitute such a deflector 4.

The endless belt 7 may be made of a rubber or a plastics.

The flat support 8 is of a box-like shape consisting of a top plate 25 and a pair of right and left side walls 26 and 27. The top plate 25 looks like a sleigh, but its opposite ends are curved downwards to be arcuate as shown in FIG. 1.

Relationships in operation between the parts and members summarized above are as follows.

The motor-installed roller 2 is fixed on a frame not shown by means of brackets 30 and 31, which supports the respective shaft ends 15 and 16 protruding from said roller 2 so as to allow said ends to rotate.

The drive pulley 5 and the driven pulley 6 are disposed on the opposite ends of the motor-installed roller 2, with the shaft thereof extending at a right angle with respect to those of said pulleys.

The drive and driven pulleys 5 and 6 are rotatably supported by frame members not shown, and the driven pulley 6 can move a permissible distance towards and away from the drive pulley 5. In other words, the spacing between those pulleys is changeable during operation of this apparatus.

Interposed between one of the shaft ends 15 of the motor-installed roller 2 and the drive pulley 5 is the rotation axis deflector 4, wherein the shaft end 15 is operatively connected to the bevel friction wheel 20 of the deflector. The intermediate wheel 22 is in a frictional contact with both the friction surface of the bevel wheel 20 and the annular groove 23 of the drive pulley 5.

The spring 9 urges always the shaft of driven pulley 6 away from that of the drive pulley, thereby biasing the spacing between those pulleys to increase.

The flat support 8 generally covers the motor-installed roller 2, such that the sleigh-shaped top plate 25 of the support overlies this motor-installed roller, with the side walls 26 and 27 of said plate covering the sides of said roller.

The drive pulley 5 and driven pulley 6 are spanned with the endless belt 7.

Among the parts and members assembled as described above, the motor-installed roller 2 and the rotation axis deflector 4 take their position surrounded by the endless belt 7, with the shaft end 15 of said roller being connected by the deflector 4 to the drive pulley 5.

The sleigh-shaped top 25 of the flat support 8 intervenes between the motor-installed roller 2 and the back surface of endless belt 7.

Figure 3:
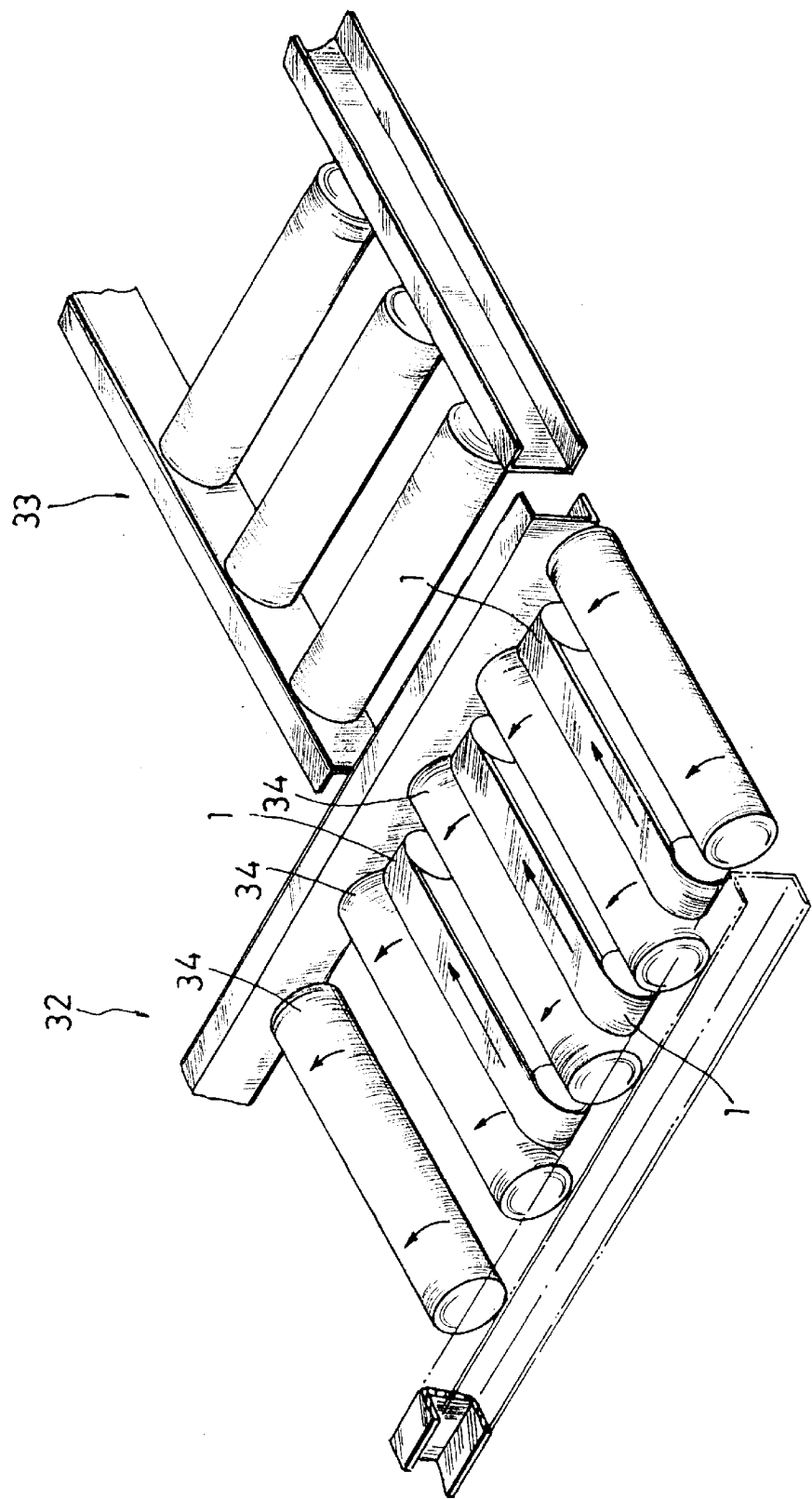
FIG. 3 is a perspective view of a roller conveyor system using the conveying apparatuses provided in accordance with the first embodiment.

As shown in FIG. 3, the conveying apparatuses 1 are disposed at the junction where a branch line 33 diverges from a main conveyor line 32 to form a roller conveyor system. The main line 32 include a plurality of motor-installed rollers 34 arranged side by side to provide spaces each between two adjacent rollers, so that in the illustrated embodiment three conveying apparatuses 1 respectively fit in the corresponding three of such spaces included in the junction.

Each of the conveying apparatuses 1 is of an overall width substantially equal to width of the endless belt 7, whereby each apparatus can be disposed easily and snugly in one of those spaces between the two adjacent roller 34 in the conveyor line 32.

Since overall height of the conveying apparatus is low enough to enable installation thereof even in a considerably narrow space left under the row of rollers 34 in the conveyor line 32.

In their normal state, each cam 3 of the apparatus intervening between the rollers 34 has its protuberance taking a lowermost position, and the sleigh-shaped top 25 of flat support 8 is at its lower dead point.

In operation, as an article for delivery to the branch line 33 advances forwards and arrives at the junction of the conveyor line 32, the motor installed in the roller 2 will be activated with an electric current. Consequently, the cylindrical casing 12 of the motor-installed roller 2 starts to spin together with the cams 3 fixed thereon. The shaft having the ends 15, 16 may preferably be designed to be resisted so that the cylindrical body 12 preferentially rotates when the motor is energized.

Those cams will thus abut against the inner surface of sleigh-shaped top 25 of the flat support 8, to thereby urge it upwards until said top lifts the upper traveling path of the endless belt 7. It is to be noted here that the driven pulley 6 has its shaft capable of displacement towards and away from the shaft of drive pulley 5, as already discussed above. Thanks to this feature, as the flat support 8 pushes up the upper path of the belt 7, the driven pulley 6 will gradually move toward the drive pulley against resilient force of the spring 9, so as to smoothly lift said upper path.

In short, the cylindrical casing 12 of the motored roller 2 rotates in a spinning manner to cause the cams 3 to urge up the support 8, which in turn will expand the belt 7 in part. The thus raised upper path of said belt will be exposed above the plane in which the tops of motored rollers 34 are included, thereby picking up the article.

Upon arrival of the support 8 at its upper dead point, a forcible braking means (detailed below) stops the cams not to rotate any more. The cylindrical casing 12 of the motored roller 2 will consequently be forced to cease its rotation. Because said casing 12 and the shaft (having its ends 15 and 16) are designed to rotate relative to each other, the casing thus stopped will force the shaft ends 15 and 16 to commence their rotation. As a result, the torque of the shaft is transmitted through the deflector 4 to the drive pulley 5 so that the latter begins rotation to initiate the circulating movement of the belt 7. The article at the junction on the conveyor line 32 will be driven in this manner to move sideways and transfer to the branch line 33.

Upon completion of the article transfer, the motored roller 2 will be activated to turn in a reversed direction so that the support 8 is lowered to retract the upper path of endless belt under the plane including all the tops of motored rollers 34 in the conveyor line 32.

In the embodiment detailed above, a belt is employed as the endless member and pulleys serve as the means for driving the belt. However, an endless chain and sprockets may substitute for such a belt and pulleys.

The embodiment has exemplified the rotation axis deflector 4 to consist of the bevel friction wheel 20, intermediate friction wheel 22 and annular groove 23 in the drive pulley 5. Such a frictional transmission is intended to relieve any overload that would injure the parts. The intermediate wheel 22 will absorb fluctuation of the motored roller 2 and/or drive pulley 5, because loose fitting and/or dimensional error of the relevant parts would possibly cause slight idle motions thereof. If such a looseness and error are merely of a negligible degree, then bevel wheels or a worm/worm gear assembly may be employed.

Although the uppermost position of the support 8 triggers the braking and stopping of the casing 12 in the foregoing embodiment, any other proper means may be used to temporarily restrain the casing at its stationary position.

A second embodiment will now be described with reference to FIGS. 4 to 18.

The conveying apparatus 35 illustrated in these figures does also employ a motor-installed roller 2 (as the 'motor-installed cylindrical device') functioning as a power source. A fixed frame 37, cams 38, stopping plates 39, upright guides 40, horizontal guides 41, a casing-resisting member 42, a transverse transporting means 43 and belts 44 do all accompany this motor-installed roller 2.

Opposite shaft ends 15 and 16 of this roller 2 respectively correspond to: the two cams 38, the two stopping plates 39, the two upright guides 40, the two horizontal guides 41 and the two belts 44.

Structure of this motor-installed roller 2 will be detailed below. It is generally similar to that which has been discussed in the foregoing embodiment, and includes a motor 45 and a speed reducer 46 held in the casing 12 (see FIG. 8). The reducer 46 in this case does also consist of a planetary gear train, and the opposite ends 15 and 16 of the shaft protrude out and longitudinally thereof. However in the present embodiment, such shaft ends 15 and 16 are each of a hexagonal shape in cross section. The motor 45 secured in this roller 2 is a brush-less motor whose output shaft can be controlled to turn selectively in forward or reverse directions. The number of actual rotations of this motor 45 is counted and summed up to regulate angular position of the casing 12 and shaft 15 and 16. Peculiar to the motor-installed roller 2 in this embodiment is annular external grooves 59 formed adjacent to the opposite ends of the casing 12, so that said roller 2 functions herein as a pulley in its entirety.

Figure 4:
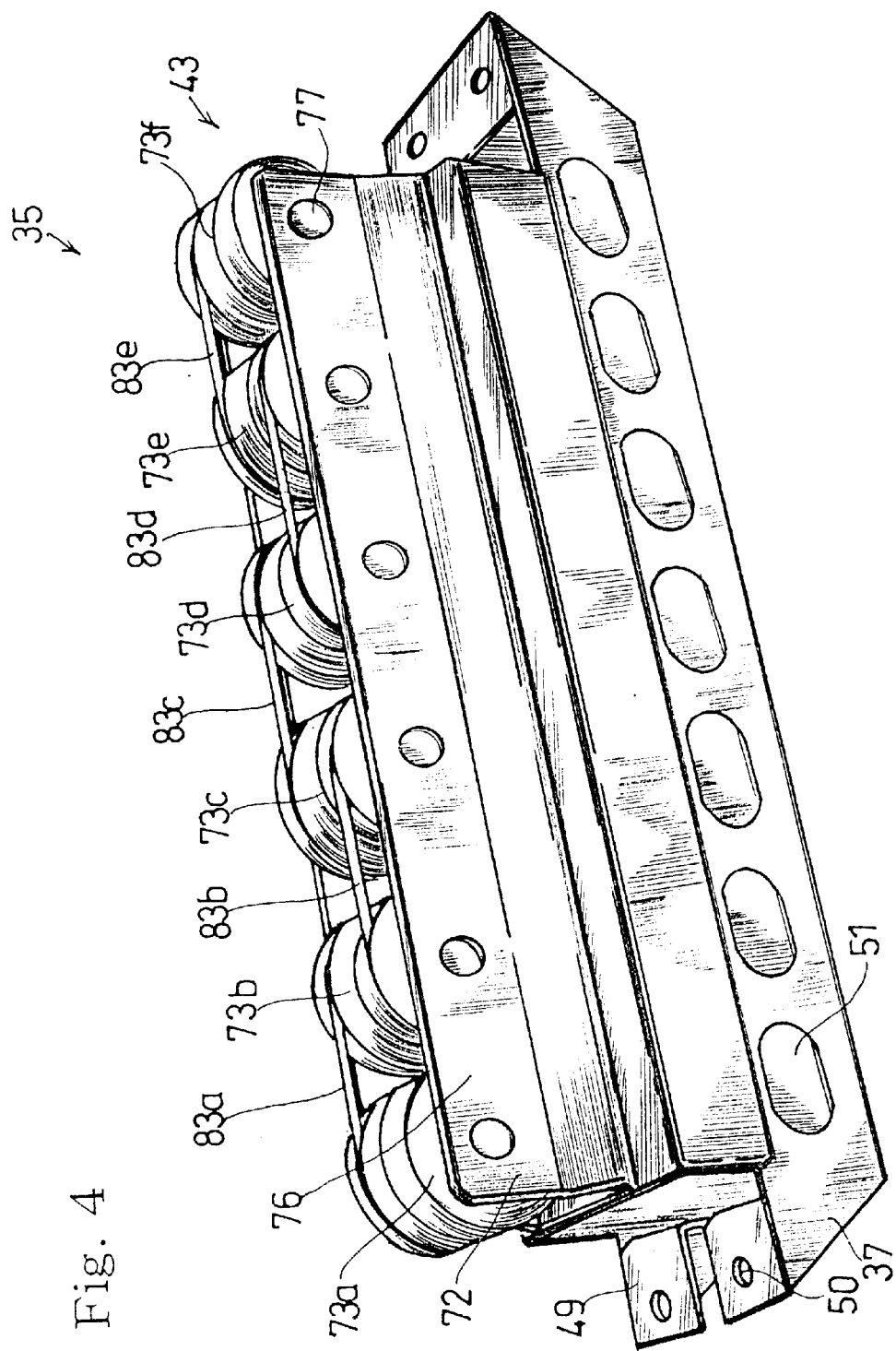
FIG. 4 is a perspective view of the conveying apparatus provided in a second embodiment of the present invention and having a flat support built therein.
Figure 10:
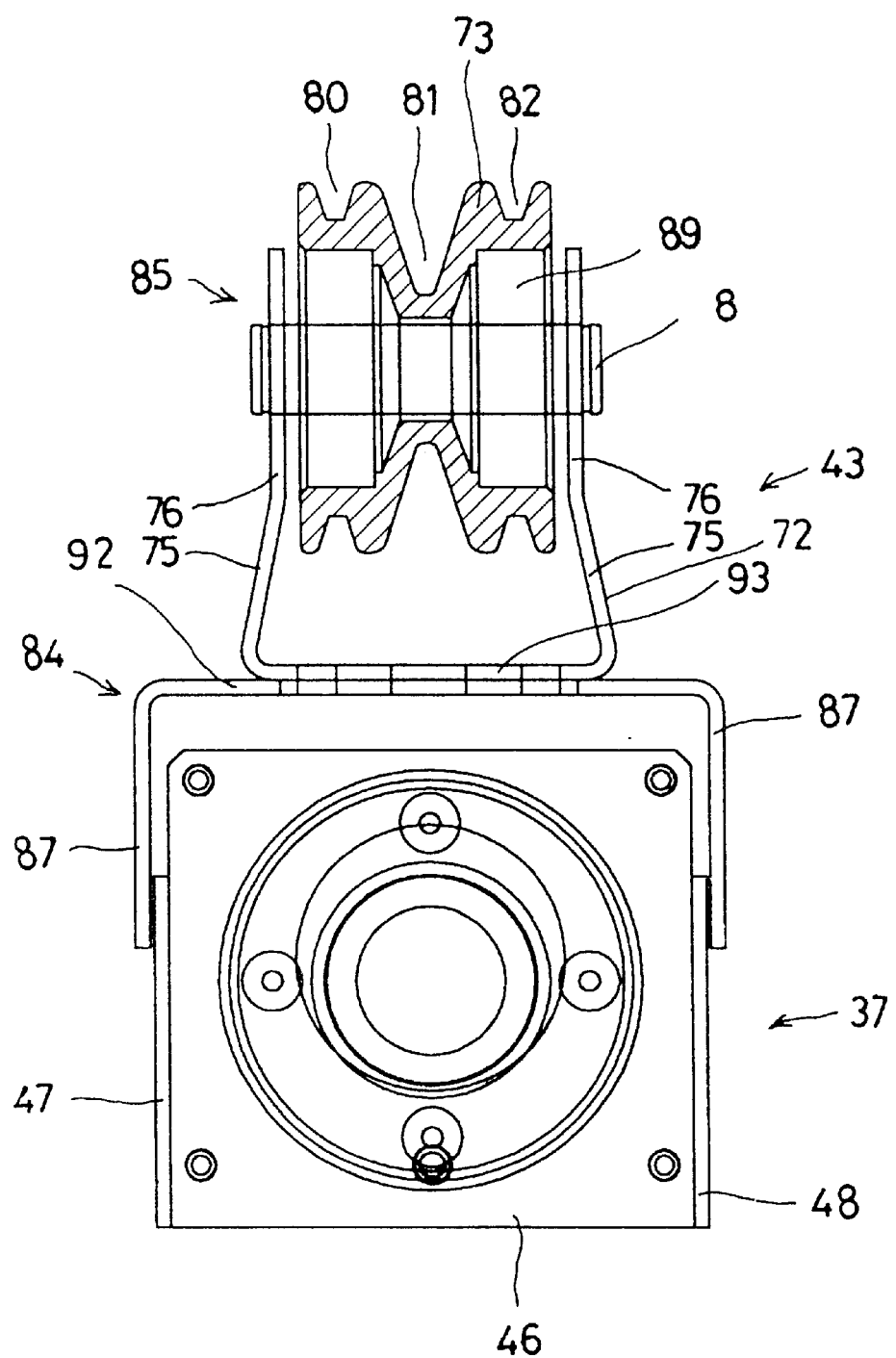
FIG. 10 is a side elevation of the conveying apparatus shown in FIG. 4.

As seen in FIGS. 4 and 10, the fixed frame 37 is generally of a channel-like shape in cross section to have a bottom 36 continuing to right-side and left-side walls 47 and 48, thus giving an open top. Each of these walls 47 and 48 have opposite extensions that protrude longitudinally of the casing of this roller. Upper ends of such extensions are bent inwardly towards each other so as to provide a pair of inner flanges 49 at the top of said fixed frame 37 and at the opposite ends thereof. Two holes 50 formed in each pair of the inner flanges 49 will be used to connect this conveying apparatus 35 to any other apparatus adjacent and relevant thereto.

Seven apertures 51 formed in each side wall 47 and 48 are intended to aid outward radiation of heat emitted from the roller 2 and also to suppress acoustic resonance of the frame.

Figure 5:
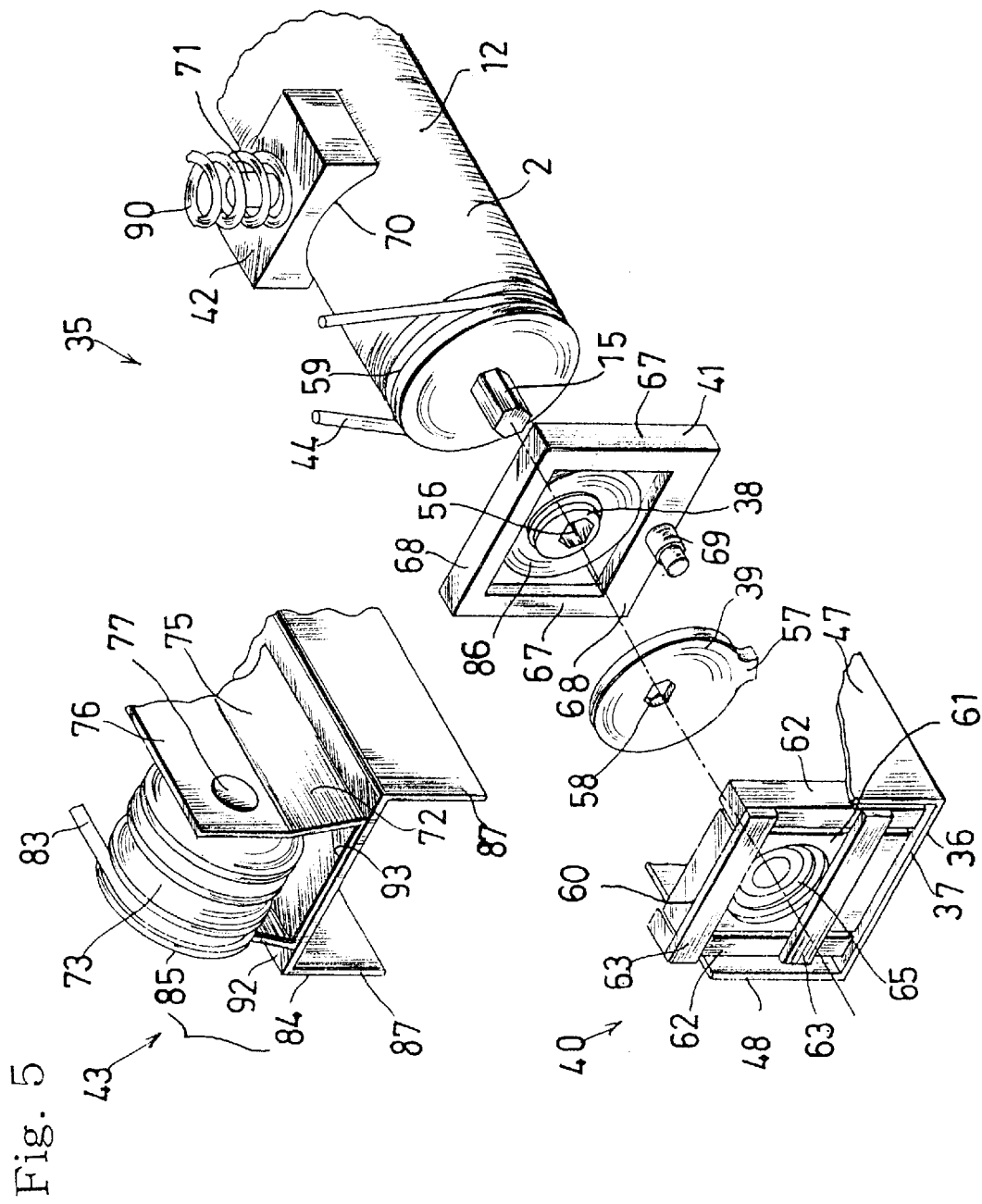
FIG. 5 is a fragmentary and exploded perspective view of principal parts included in the conveying apparatus shown in FIG. 4.
Figure 11:
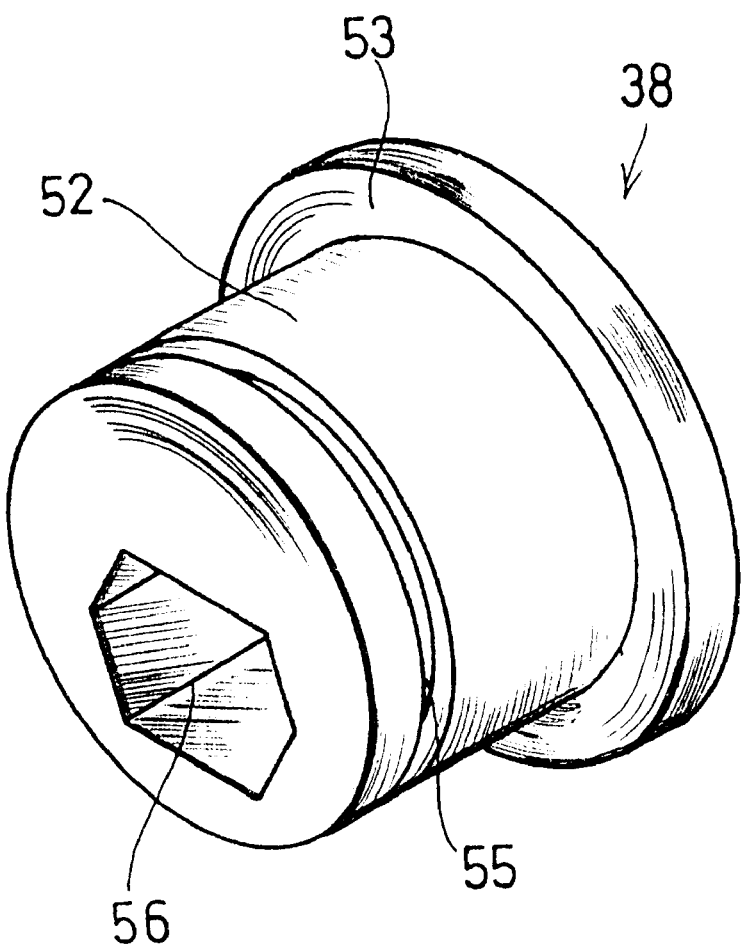
FIG. 11 is a perspective view of one of cams incorporated in the conveying apparatus shown in FIG. 4.
Figure 12:
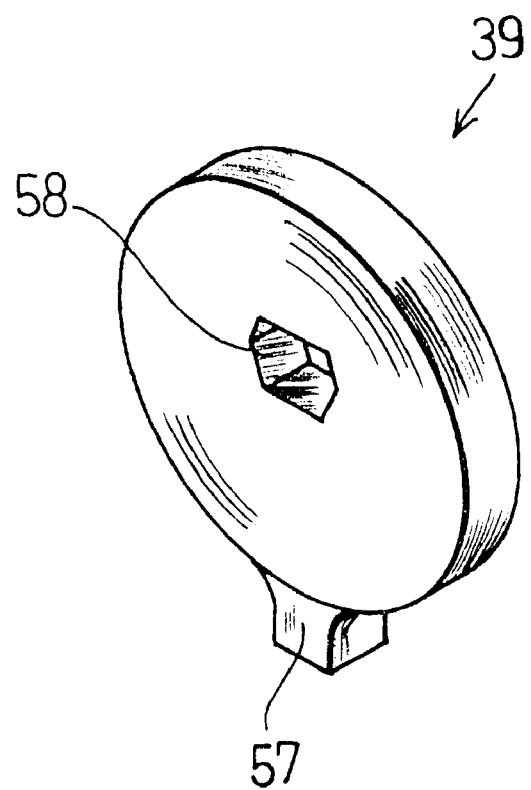
FIG. 12 is a perspective view of one of stopping plates used in the conveying apparatus shown in FIG. 4.
Figure 13:
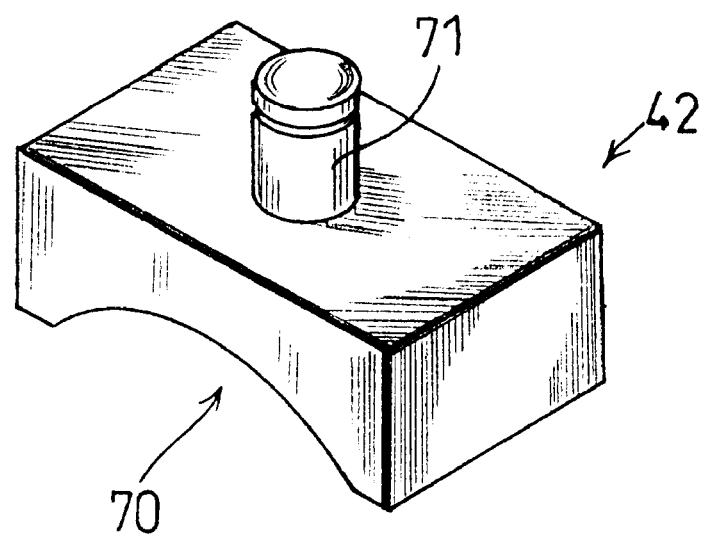
FIG. 13 is a perspective view of a casing-resisting member used in the conveying apparatus shown in FIG. 4.

As shown in FIGS. 5 and 11, each cam 38 has a columnar body 52 and a flange 53 formed integral with one end of the body. The cam has an annular groove 55 formed in this body 52 and adjacent to the other end thereof. A ball bearing 86 surrounds the columnar body of this cam in such a state that the flange 53 abuts against one face of the bearing's inner race, with the other face thereof being retained in place with a C-ring or the like fitted in the annular groove 55.

A hexagonal eccentric bore 56 penetrating axially of each cam 38 firmly fits on the shaft end 15 and 16 of the motor-installed roller 2.

The generally round stopping plate 39 has a lug 57 that protrudes out radially from one peripheral zone of this plate, which also has a hexagonal and slightly eccentric aperture 58.

Each upright guide 40 consists of a retainer 60 and a slider 61 movably held therein. The retainer 60 consists of two parallel pillars 62 and two parallel beams 63 attached to fronts of these pillars. There is no obstacle between the two beams, over their whole length.

The slider 61 is a rectangular plate, and a ball bearing 65 firmly fits in one side of this plate.

This slider 61 always contacting and intervening between the pillars 62 can slide only vertically along them and within the upright guide 40.

Each horizontal guide 41 is a generally rectangular frame composed of two vertical parts 67 and two horizontal parts 68 having parallel inner faces. These parts define therebetween a cavity for receiving the cam 38, as will be detailed later.

The lower one of said horizontal parts 68 has a protrusion 69 jutting from a middle portion of this part and in a direction parallel to the axis of the roller 2. In the present embodiment, such a protrusion 69 cooperates with the stopping plate 39 so as to function as the shaft-resisting means mentioned above.

Lids covering the front and rear faces of this horizontal guide are not shown in the drawings.

On the other hand, the casing-resisting member 42 is made of a Nylon (trademark) or the like plastics. It has on its one side a recess 70 semi-cylindrically arcuate in cross section, and also has a pin 71 that jutting from its other side and having a threaded end.

The transverse transporting means or device 43 includes six pulley-shaped short rollers 73a to 73f that are held in place and rotatably on an elongated support 72. In detail, this support 72 consists of a covering part 84 (for the motor-installed roller 2) and a holding part 85 for retaining the short rollers 73a etc. The covering part 84 is an elongate channel formed by bending a steel strip to have a top 92 and side-walls 87.

As shown in FIG. 5, the holding part 85 for the rollers 73a etc. is also made by bending another steel strip to have a flat bottom 93 as well as a pair of gently bent side walls 75. Lower regions of both the side walls 75 are slightly inclined inwardly towards the bottom 93. Their upper regions 76 above middle height stand in parallel with each other (see FIG. 10) to have round holes 77 for rotatably bearing the shafts 88 of the transverse transporting rollers 73a etc.

As described above, the elongated support 72 for the transverse transporting device 43 includes the holding part 85 disposed on the covering part 84, wherein the top 92 of the latter part is welded to the bottom 93 of the former part in a back-to-back manner. Openings (not shown) formed in such overlapped top and bottom will allow the respective belts 44 to run therethrough, as will be detailed below.

Figure 14:
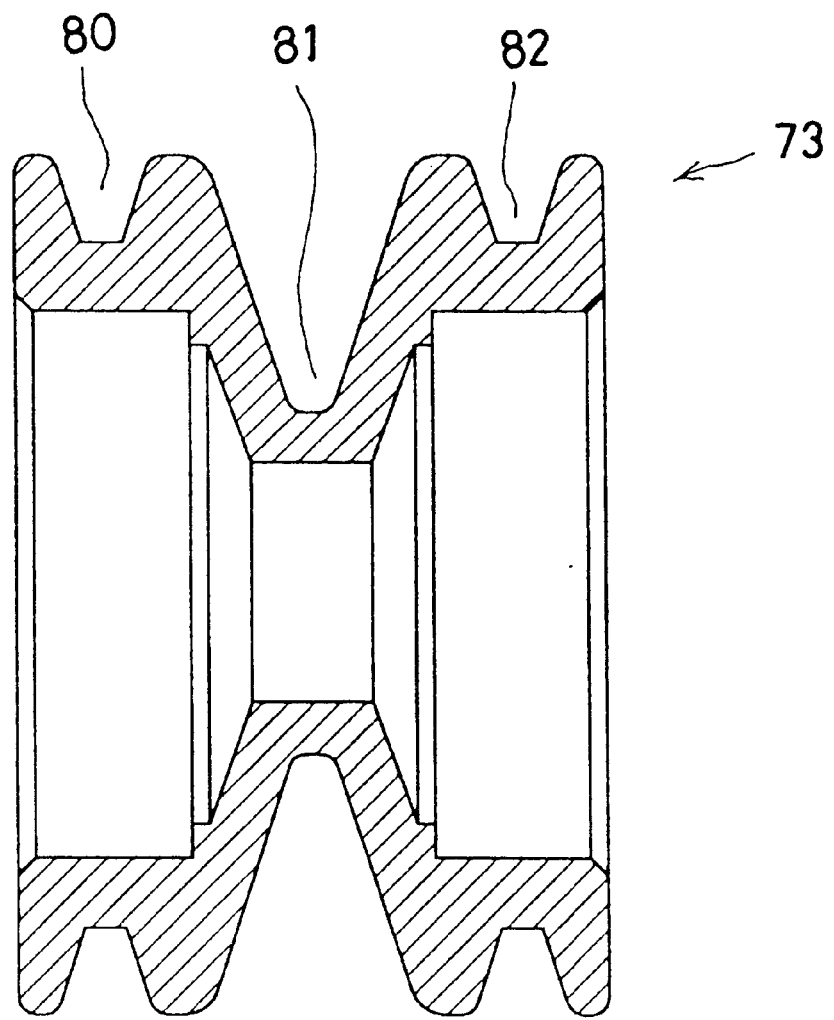
FIG. 14 is a cross section of one of the pulley-type rollers used in the conveying apparatus shown in FIG. 4 so as to move an article sideways.

Although the transverse transporting rollers 73a etc. are of a generally columnar shape, each of them has three annular V-shaped grooves 80, 81 and 82 (see FIG. 14). The two outer V grooves 80 and 82 are of the same shape and the same size, while the middle V groove 81 is made deeper than the outer grooves 80 and 82.

Figure 6:
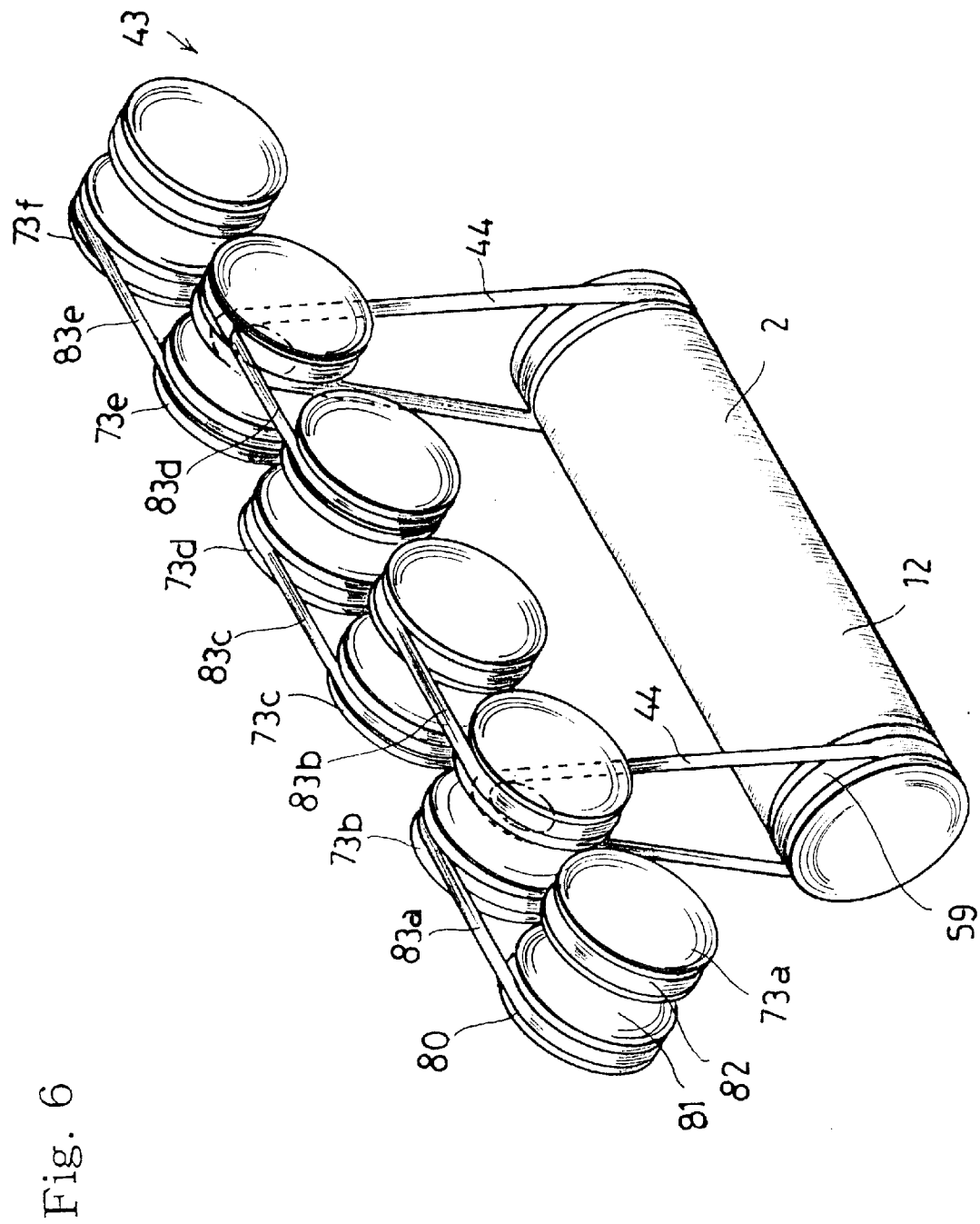
FIG. 6 is a perspective view of a row of pulley-type rollers constituting a transporting means in the conveying apparatus shown in FIG. 4.
Figure 9:
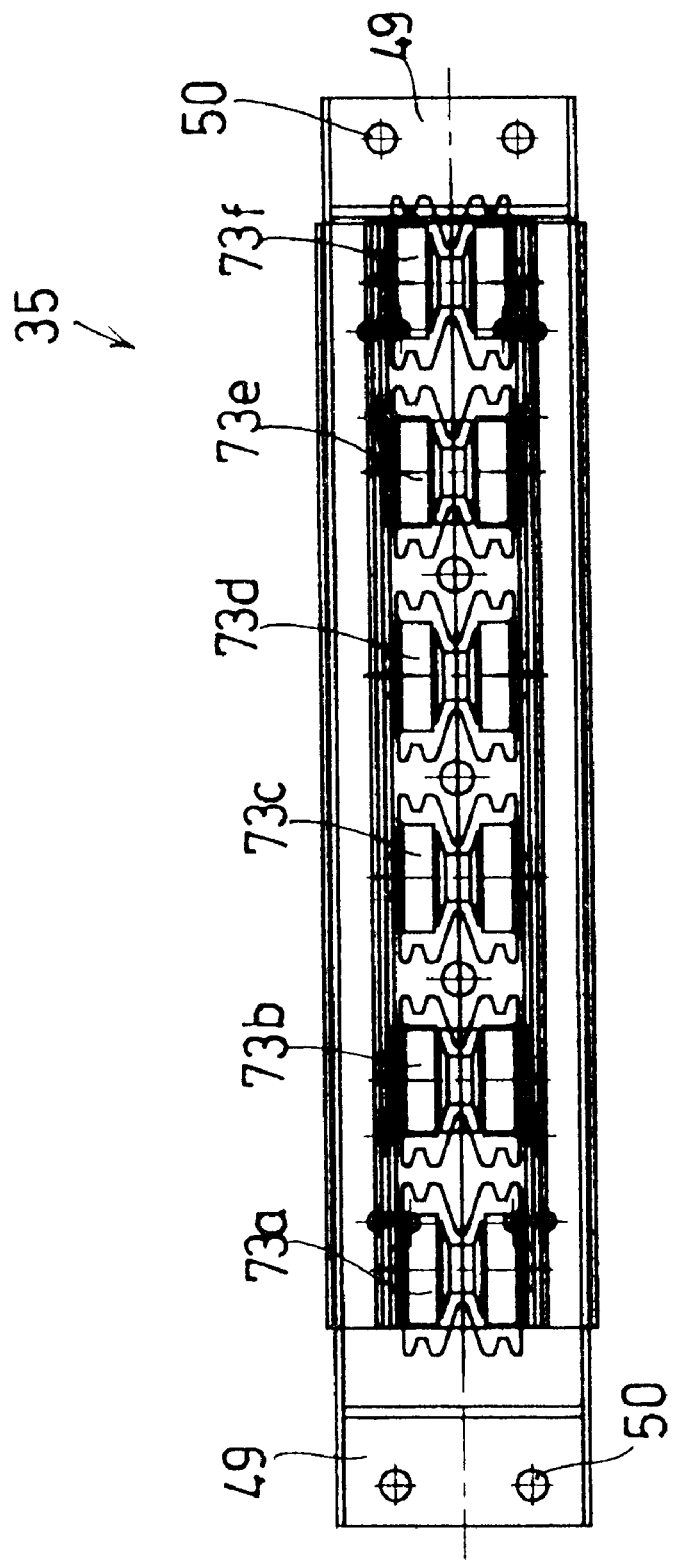
FIG. 9 is a plan view of the conveying apparatus shown in FIG. 4.

As shown in FIG. 10, the transverse transporting rollers 73a etc. are connected each by a shaft 88 and ball bearings 89 to the elongated support 72 so as to be rotatable therein, and are arranged to form a row (see for example FIGS. 6 and 9). Two pairs of the neighboring leftward short rollers are operatively connected by typically V-shaped transmission belts 83a (engaging the shallower V-grooves 80 in rollers 73a and 73b), and 83b (engaging the other shallower V-grooves 82 in rollers 73b and 73c), respectively. Likewise, three remaining pairs of the adjacent rightward rollers are also connected respectively by similar belts 83c (engaging the shallow grooves 80 in rollers 73c and 73d), 83d (engaging the grooves 82 in rollers 73d and 73e), and 83e (engaging the grooves 80 in rollers 73e and 73f), in this order from left to right in the drawings.

All of the transverse transporting rollers 73a to 73f will thus turn in unison with each other within the transverse transporting device 43, so that if one of those rollers is actuated, all the remaining ones will be driven in a synchronous manner.

As will be fully discussed hereinafter, the two short rollers 73b and 73e located inside and adjacent to the respective outermost rollers 73a and 73f are intended in this embodiment to function as the power-inputting members.

Now, some important and functional relationships between the constituent parts will be discussed to supplement the foregoing description.

As already noted above, the conveying apparatus 35 of the present embodiment does include the single fixed frame 37, motor-installed roller 2, transverse transporting means 43, the two cams 38, stopping plates 39, upright guides 40, horizontal guides 41, and the single casing-resisting member 42. The motor-installed roller is disposed inside the fixed frame 37, with the transverse transporting means 43 overlying this frame 37 so that the covering part 84 of this means 43 covers the upper region of said frame.

The fixed ones among these parts are secured to the fixed frame 37, and the movable ones among them are disposed around the motor-installed roller 2.

The motor-installed roller 2 and some other important parts will be detailed further as to relationship between them.

Each of the shaft ends 15 and 16 protruding from the opposite ends of the motor-installed roller 2 will receive the cam 38, stopping plate 39 and the slider 61 of upright guide 40 to be mounted thereon in this order from inside to outside.

The hexagonal shaft ends 15 and 16 are firmly fitted in the hexagonal bores 56 of the respective cams 38, thereby inhibiting them 15 or 16 and 38 from rotating relative to each other.

Each cam 38 fixed on the roller's 2 shaft end 15 or 16 has an outer periphery enclosed with the ball bearing 86 (hereinafter referred to as 'cam-surrounding ball bearing'), which in turn is held in a rectangular cavity defined in the corresponding horizontal guide 41. Therefore, the horizontal parts 68 and 68 of this guide 41 have their inner surfaces always kept in contact with the cam-surrounding ball bearing 86 disposed in said guide.

Such a ball bearing 86 is intended to reduce frictional resistance that would otherwise be observed between each horizontal guide 41 and the corresponding cam 38. From a practical point of view, those cam-surrounding ball bearing 86 cooperate with and move integrally with the respective cams 38 so as to make them smoother cams. In other words, such an integrated assembly of the bearing 86 and cam 38 may be regarded as a 'composite' cam. However, those cam-surrounding ball bearings 86 may be replaced with any other type of bearings, or may be dispensed with.

The lids (not shown) cover the front and rear face of the horizontal guide 41, so that the cam 38 and bearing 86 are protected from slipping off this guide.

As noted just above, each cam-surrounding ball bearing 86 is held in the rectangular cavity of horizontal guide 41 and always in a point contact with both the inner faces of upper and lower horizontal parts 68. Due to this structure, the cam 38 surrounded and accompanied by this bearing 86 has a freedom of movement only in a horizontal direction, and cannot move up and down.

Such horizontal guides 41 are rigidly secured on the fixed frame 37, and the protrusions 69 as stoppers extending out from these guides are projected towards the respective stopping plates 39.

The stopping plates 39 on the respective shaft end 15 and 16 are located each beyond the corresponding cam 38. These plates' hexagonal openings 58 fit on the hexagonal shaft ends so that the former members are inhibited from rotating relative to the latter. Thus, each stopping plate 39 will rotate synchronously with the cam 38 and the shaft end 15 or 16 of the motor-installed roller 2. The stopper 69 protruding from each horizontal guide 41 intersects the rotation locus of the lug 57 that protrudes from the periphery of stopping plate 39.

Extremity of each shaft end 15 or 16 is inserted in the slider 61 of corresponding upright guide 40. The ball bearing 65 attached to the slider 61 has its inner race to hold the extremity such that each shaft end can rotate relative to the slider 61.

As noted above, this slider 61 can move only along the pillars 62 constituting the retainer 60. Since these pillars 62 are disposed upright in the present embodiment, each slider 61 as well as the shaft end 15 or 16 inserted therein are allowed to move only vertically.

As mentioned above, the retainer 60 in each upright guide 40 is rigidly connected to the fixed frame 37, with the slider in this retainer being operatively connected to the transverse transporting device 43.

Positional relationship between the motor-installed roller 2 and the transverse transporting device 43 will now be described. The row of six pulley-shaped short rollers 73a to 73f as the main part of this transporting device 43 are located right above the roller 2. Therefore, the longitudinal axis of such a row of short rollers is aligned with the axis of said motor-installed roller 2. Further, a vertical projection of these short rollers 73a to 73f generally coincides with a contour of the roller 2. The annular grooves 59 of the motor-installed roller 2 are formed in the casing 12 and near its opposite ends, thus located right beneath the two short rollers 73b and 73e closest to the outermost ones 73a and 73f, respectively.

Each of the belts 44 is spanned between one of those annular grooves 59 and the middle deeper V-shaped groove 81 of the short roller 73b or 73e located right above said annular groove.

The casing 12 of motor-installed roller 2 has each annular groove 59 whose horizontal rotation axis overlies the horizontal rotation axis of the transverse transporting short roller 73b or 73e, and in plan view the former axis intersects the latter axis. Each annular groove 59 is thus at the so-called 'distorted' position relative to the middle V groove 81, so that each belt 44 employed herein is a crossed belt, more specifically, a quarter-twisted belt. A vertical line including the center of such an annular groove 59 does however coincide with the vertical line likewise including the center of V groove 81. Thanks to this feature and the increased depth of such a middle deeper V groove 81, the crossed belt 44 will disengage neither from the annular groove 59 nor from the V groove 81 of short roller 73b or 73, although slightly distorted at its inter-mediate portion between these grooves. Such a crossed belt 44 effectively transmitting power one from another in this way does constitute the deflecting means in this embodiment.

Thus, once the casing 12 of the motor-installed roller 2 is actuated, it drives the belts 44 around it to run and actuate short rollers 73b and 73e as the power-inputting members. As a result, these rollers will start to spin in situ together with the remaining ones 73a, 73c, 73d and 73f. This is because the transmission belts 83a to 83e are used herein to operatively connect them to each other, On the other hand, the casing-resisting member 42 is overlaid on the casing 12 of motor-installed roller 2 such that its arcuate recess 70 stands in a sliding contact with the periphery of this casing. The pin 71 protruding from the upper face of resisting member 42 and inserted in and through a cylindrical opening (not shown) has a threaded end, on which a proper nut is fastened. Such a pin 71 guides this member 42 to move up and down, but inhibits it from slipping off. As shown in FIG. 5, a coiled spring 90 surrounding the pin 71 always urges the lower face towards the casing 12, imparting thereto a constant resistance against the motor-installed roller 2.

The conveying apparatus 35 of this embodiment can be equipped in a roller conveyor 32 included in a conveyor line, in a fashion similar to the case in first embodiment. The apparatus 35 may be incorporated in such a line at its location, from where a branch line 33 diverges as shown in FIG. 3. For example, the apparatus or apparatuses 35 will be disposed each in between the two adjacent motor-installed rollers 34 forming the conveyor line.

Figure 7:
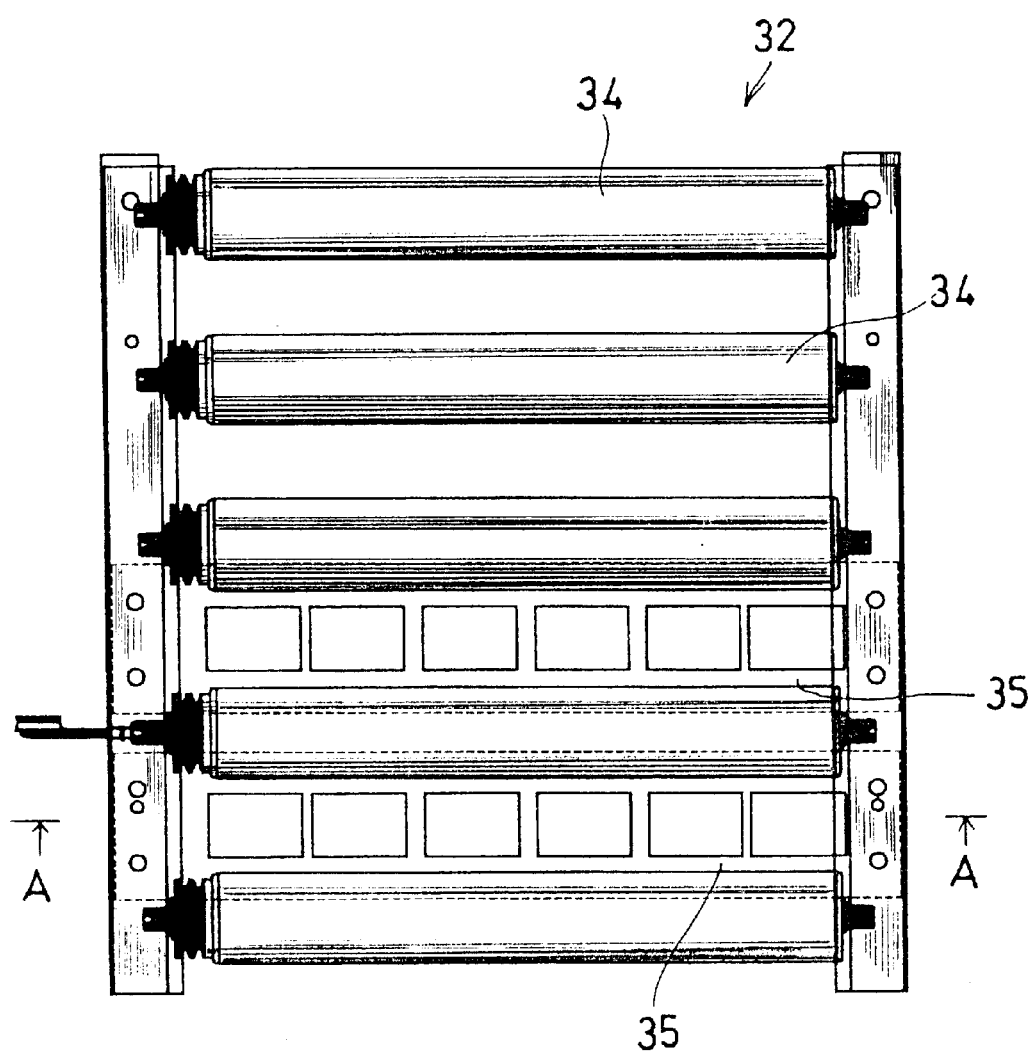
FIG. 7 is a plan view of another roller conveyor system using the conveying apparatuses provided in accordance with the second embodiment.
Figure 8:
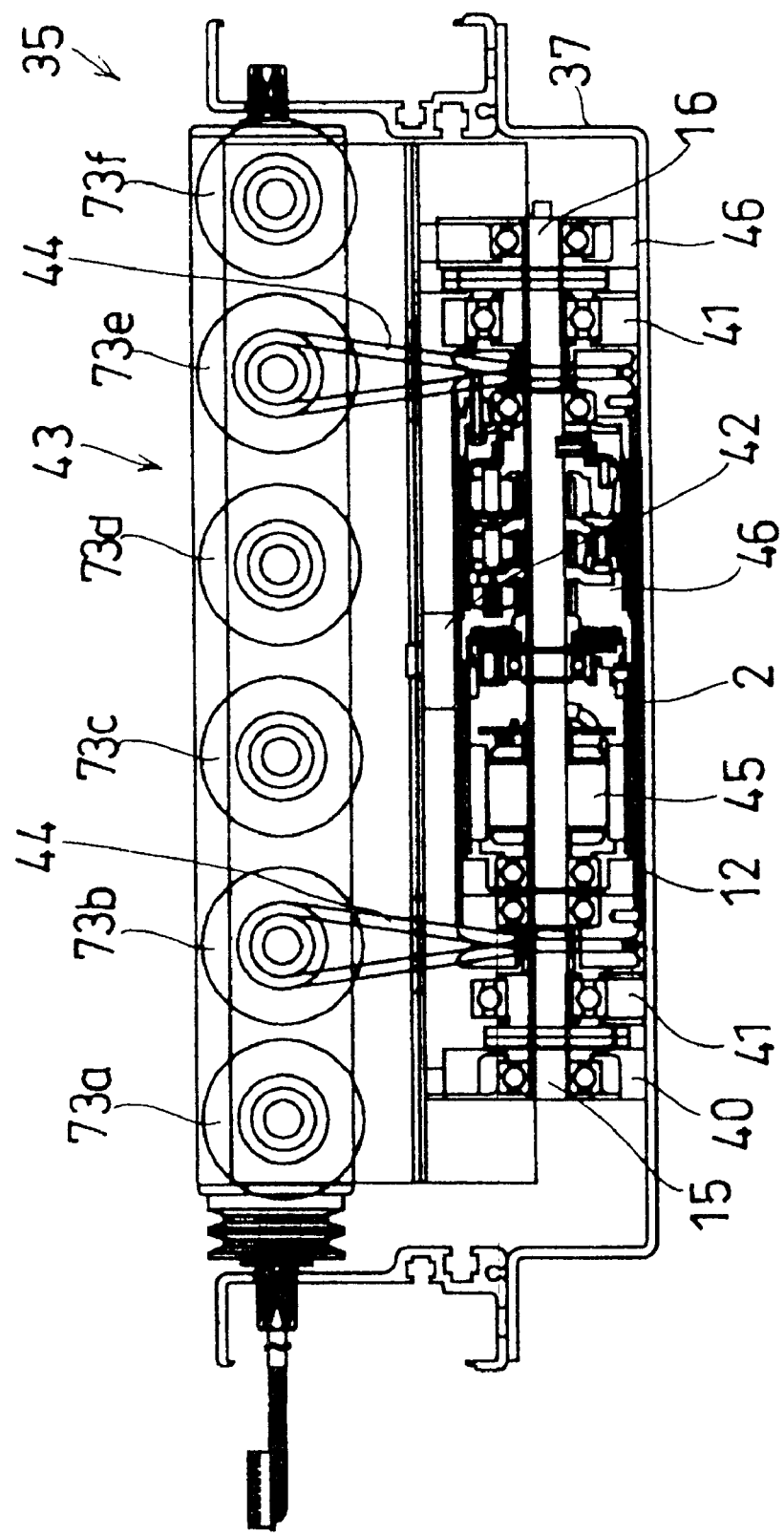
FIG. 8 is a cross section taken along the line A—A in FIG. 7 and showing a roller conveyor line in part and in addition to the apparatus of FIG. 4.

FIG. 7 illustrates an example wherein two such apparatuses 35 of the second embodiment are disposed in a branching station of a conveyor line (with its branch being not shown).

Each apparatus 35 has an overall width substantially equal to that of a gap present between the two neighboring rollers 34. Therefore, the gaps can neatly receive the respective apparatuses 35 neatly and smartly.

Figure 18:
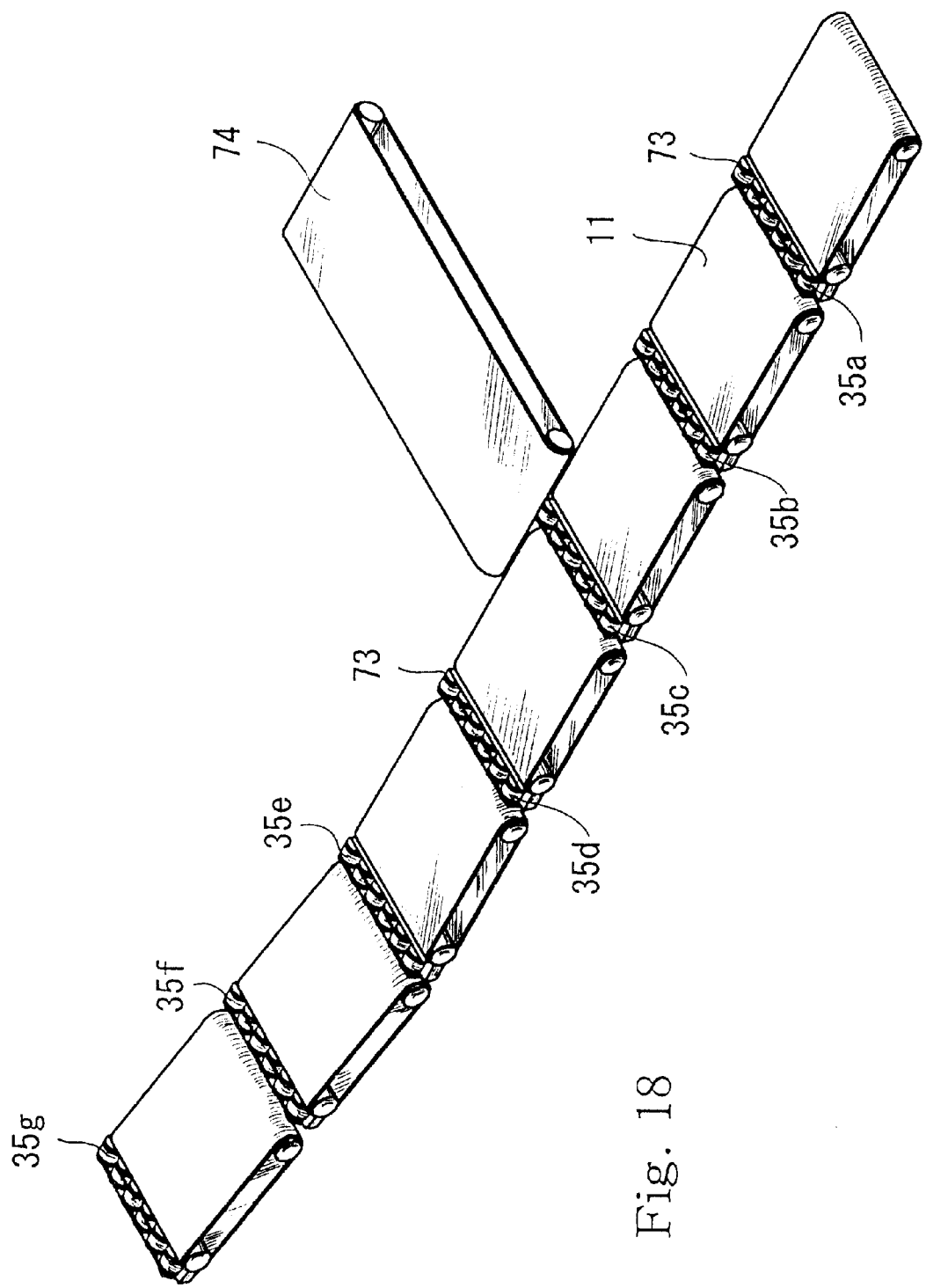
FIG. 18 is a perspective view of a conveyor assembly also provided herein from still another aspect of the present invention.
Figure 19:
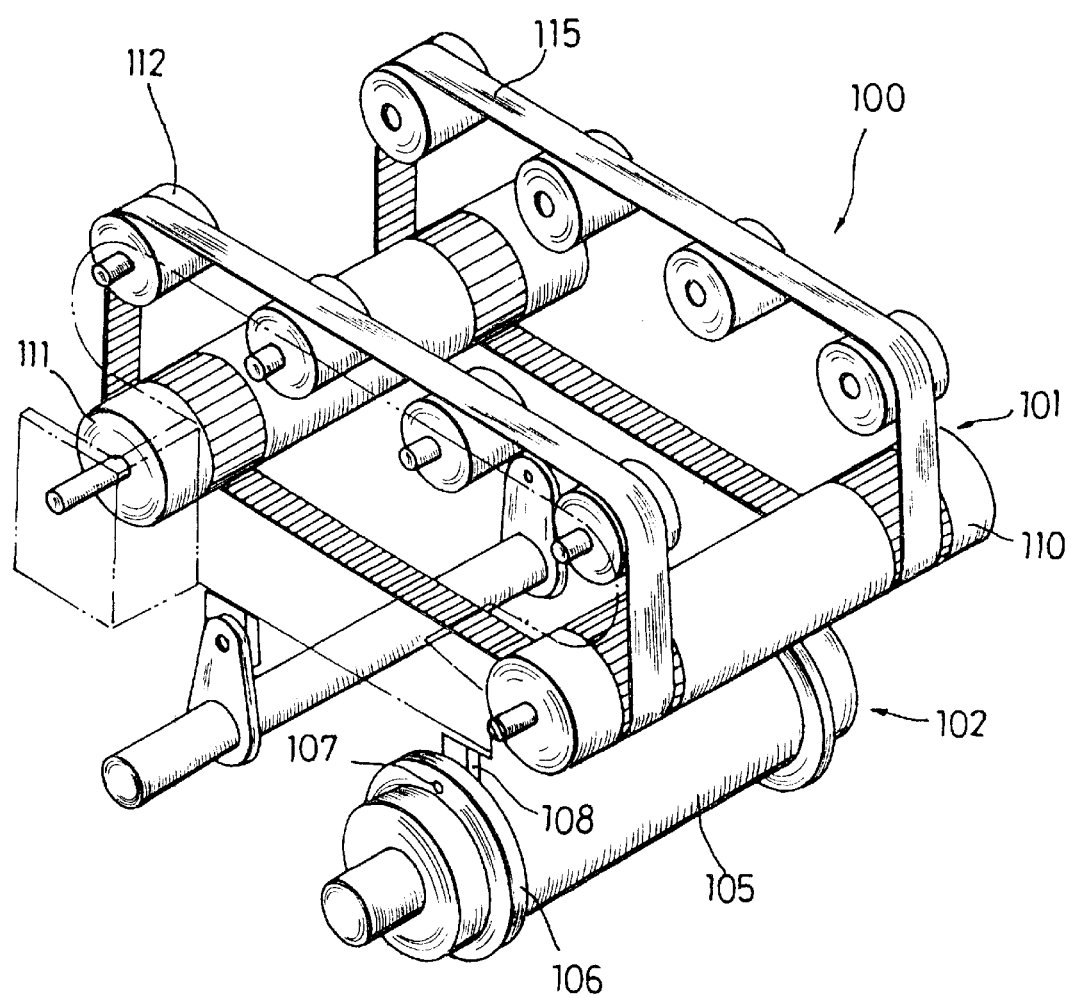
FIG. 19 is a perspective view of the prior art cross feeder.

The conveying apparatus 35 either of the first or second embodiment can be applied also to a line consisting of unit conveyors, which may either be roller conveyors or belt conveyors. FIG. 18 shows a line formed of unit belt conveyors 11 and including between the adjacent two of them each of the present apparatuses 35a to 35g. An article conveyed transversely out of the line by apparatus 35c is further conveyed by a belt conveyor 74.

Figure 15:
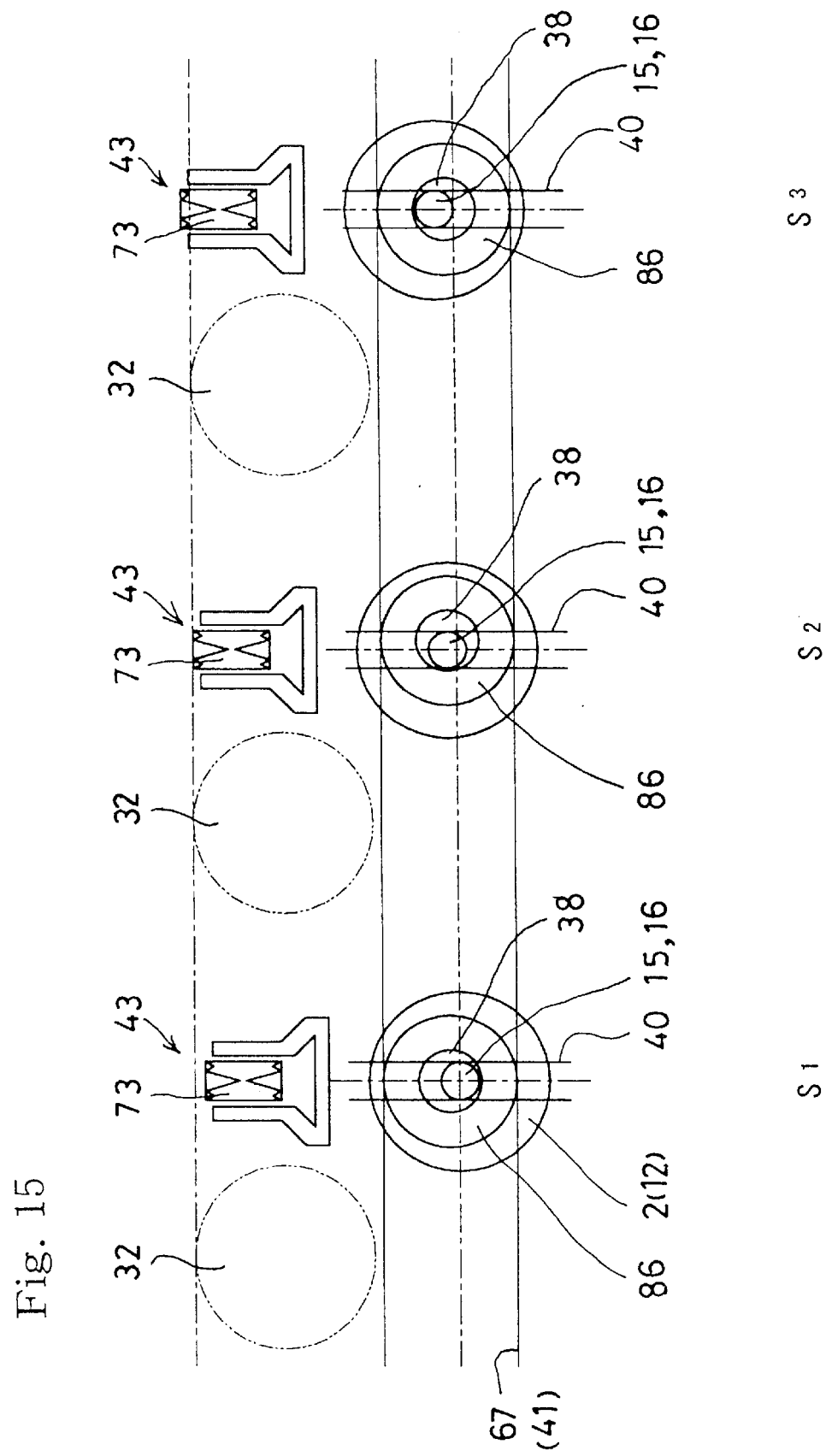
FIG. 15 is a scheme illustrating the function of the conveying apparatus of FIG. 4, and showing relationship in position between a motor-installed roller, a cam, a ball bearing enclosing the cam, horizontal guides, upright guides, a transverse transporting means and a row of conveyor rollers.
Figure 16:
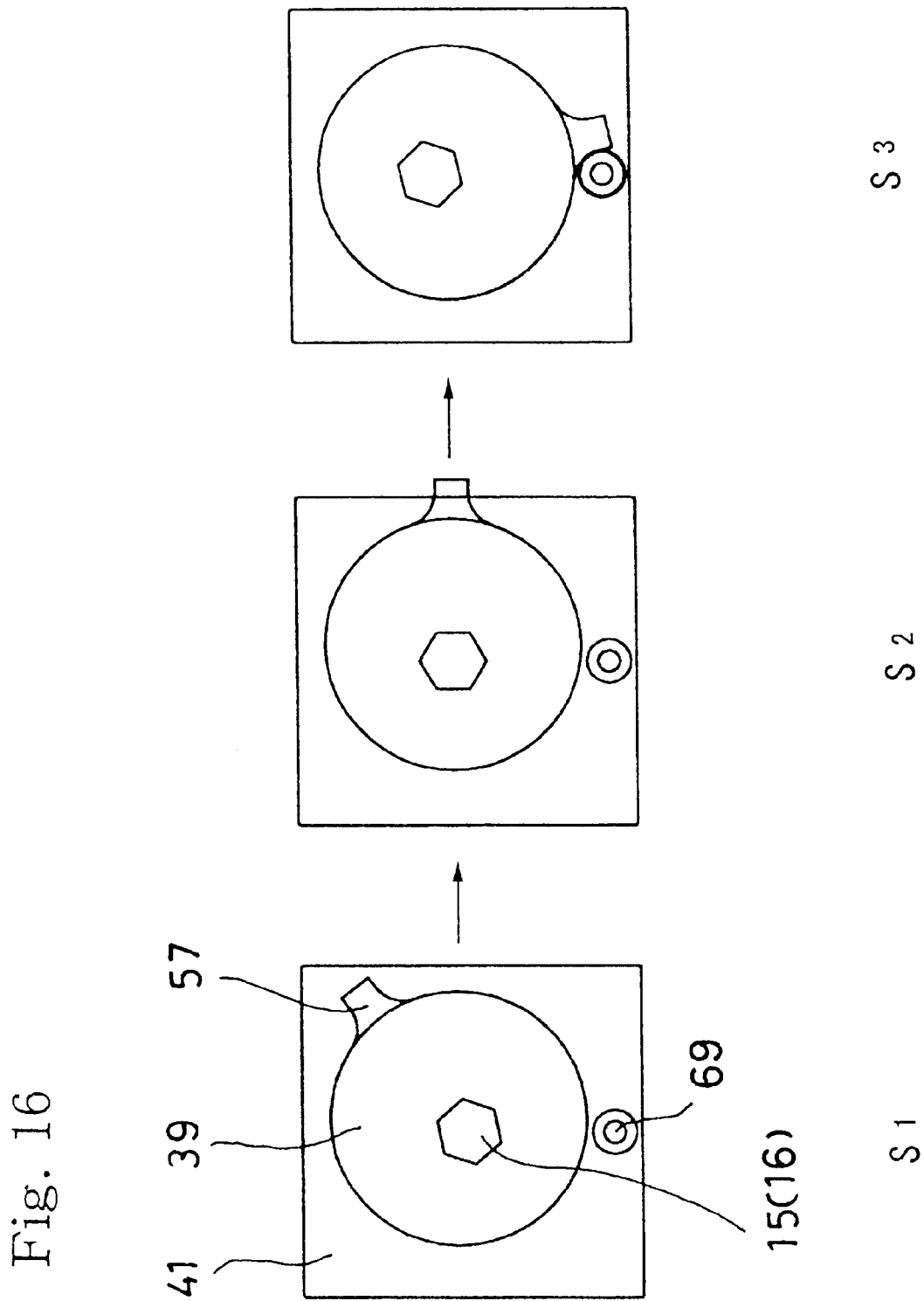
FIG. 16 is a scheme illustrating the forward motion of the conveying apparatus of FIG. 4, and showing relationship in position between a shaft of the motor-installed roller, one of stopping plates and a stopper.

In operation, the constituent parts and members of the apparatus 35 of the present embodiment will work as shown in FIGS. 15 and 16. FIG. 15 illustrates how the conveying apparatus 35 operates, showing positional relationships between its motor-installed roller 2, cams 38, cam-enclosing ball bearings 86, horizontal guides 41, upright guides 40, and transverse transporting device 43, in addition to conveyor rollers 32.

The largest solid circles in FIG. 15 denote the casings 12, with the solid smallest circles denoting the shaft ends 15 and 16 protruding from each casing of the motor-installed roller 2. The inner eccentric circles drawn around the shaft ends 15 and 16 denote the cams 38, and the outer eccentric circles drawn each between the largest solid circle and the inner eccentric circle denote the cam-enclosing ball bearings 86.

Parallel horizontal lines indicate the horizontal guides 41, with parallel vertical lines indicating the upright guides.

As already mentioned above, each cam-enclosing ball bearing 86 in this apparatus 35 is held in the rectangular cavity defined in each horizontal guide 41. The horizontal parts 68 of this horizontal guide always in contact with the bearing 86 afford to the cam 38 and bearing 86 only a freedom of movement in a horizontal direction, but inhibiting their vertical movement.

The slider 61 in each upright guide 40 can move only along the pillars 62 in each retainer 60, thus restricting the shaft ends 15 and 16 inserted in these sliders 61 to make on a vertical motion.

The transverse transporting device 43 adjoined to the sliders 61 will move following the shaft ends 15 and 16 of the motor-installed roller 2.

FIG. 16 illustrates a forward or normal operation of the present conveying apparatus 35, by depicting the shaft end 15 or 16 of roller 2 with central hexagons, and the stopping plate 39 with single circles each having a lug 57. The outer rectangular contours denote one of the horizontal guides 41, with the double circles denoting the stopper 69.

Each cam 38 and each cam-enclosing ball bearing 86 in this apparatus 35 are accommodated and held in the rectangular space in the horizontal guide 41, not to move up and down. This guide 41 is rigidly secured to the fixed frame 37, so that the shaft ends 15 and 16 causing angular displacement of the cam 38 and bearing 86 will vary its height according to change in angular position of this cam 38.

It is to be noted again that the roller's 2 shaft ends 15 and 16 are in operative engagement with the slider 61 in upright guide 40 movable only in vertical direction. Therefore, these ends 15 and 16 are caused to move also in vertical direction.

Due to such functions of the horizontal and upright guides 41 and 40, the shaft ends 15 and 16 have a freedom of movement only in vertical direction. Height of each shaft end 15 and 16 depends only upon the angular position of the cam 38. Height of the transverse transporting device 43 connected by the slider 61 to the shaft ends 15 and 16 does also depend only upon the angular position of the cam 38.

Each conveying apparatus 35 is placed in the gap present between the neighboring two motor-installed conveyor rollers 32, as noted above. As shown at S1 in FIG. 15, the protuberant region of the cam 38 is at its position relatively higher than the shaft ends 15 and 16 driving the cam 38. The transverse transporting device 43 is consequently at its relatively low position, causing the transporting short rollers 73 to be retracted below the top surface of conveyor line.

As also seen at S1 in FIG. 16, the stopping plate 39 in this state is at its normal position causing its lug 57 to be located rightward of and higher than the shaft ends.

If and when an article is transferred onto a branch diverged from the roller conveyor line 32, the motor 45 in the motor-installed roller 2 will be switched on to rotate either the casing 12 or the shaft ends 15 and 16. However at a timing shown at S1, the latter 15 and 16 will be driven preferentially.

This is because, in this state, the coiled spring 90 always urging the casing-resisting member 42 towards the casing 12 of motor-installed roller 2 will be intensively pressing this member to this casing. A considerably strong resistance thus applied to the casing will make it difficult for this casing to rotate. In contrast, resistance against the shaft ends 15 and 16 is relatively weaker to enable them to rotate while keeping the casing 12 stationary. As a result, the cam 38 integral with each shaft end will rotate to change its angular position from S1 to S2 and then from S2 to S3 as shown in FIG. 15. The transverse transporting device 43 will change its height determined solely by the cam's angular position, as noted above. Therefore, until the cam 38 reaches the position S3 where its protuberance does face downwards, through the intermediate position S2 where the protuberance does face sideways, the shaft ends 15 and 16 will continue to ascend gradually to consequently raise the transverse transporting device 43. At the position S3, the transporting short rollers 73 in this device protrude up beyond the top surface of the roller conveyor line so as to lift the article at the diverging station.

Similarly to the cams 38, the stopping plates 39 are firmly secured on the respective shaft ends 15 and 16, so that these plates 39 will rotate synchronously with said cams. Thus, with the cam's protuberance having reached the position S2 in FIG. 15, the stopping plate's lug 57 will simultaneously have reached its position S2 as shown in FIG. 16. As the shaft ends 15 and 16 continue to rotate causing the cam's protuberance to face downwards at the position S3 in FIG. 15, the stopping plate's lug 57 will come to its position S3 facing obliquely downwards as shown in FIG. 16. At the instance when this lug 57 collides with the stopper 69, an extremely strong brake will be applied to the shaft ends 15 and 16 to be stopped.

As already noted above, the energized motor 45 necessarily causes rotation of either the casing 12 or shaft ends 15 and 16. If the shaft ends are restrained from rotation due to collision of the stopping plate's lug 57 with the stopper 69 as at the position S3 in FIG. 16, then the casing 12 of motor-installed roller 2 will be forced to initiate its rotation against the casing-resisting means 42.

Consequently, the belts 44 engaging with and driven by the casing 12 will start to run to transmit power to and drive the transporting short rollers 73b and 73e (serving as the power-inputting members), which in turn will drive the remaining short rollers 73a, 73c, 73d and 73f by means of the horizontal belts 83a to 83e.

Such sequential motions of these members will displace sideways the article on the roller conveyor line 32 so as to transfer to the branch line 33.

Upon completion of such a transfer, the motor-installed roller 2 will be switched over into its reverse rotation so that the transporting rollers 73a to 73f stop rotating and the transverse transporting device 43 carrying these rollers start to descend.

In detail, the roller 2 now rotating in reverse direction will cause the stopping plate's lug 57 to change its position from towards S3 and then to S2 in FIG. 16, so as to depart from the stopper 69. On the other hand and at the same time, the shaft ends 15 and 16 are permitted to rotate again but in reverse direction, due to reaction from the casing 12 constantly braked with resisting member 42. The number of reverse rotations of the motor 45 will simultaneously be counted up to know an end point of reverse motions of these members. At this end point, the motor 45 will be switched off to allow the cam 38 to have its protuberance facing upwards, thereby sinking the transverse transporting device 43 to its home position as shown at S1 in FIG. 15.

In the system of the conveying apparatus 35 exemplified above, the number of rotation of the brush-less motor 45 built in the roller 2 is counted to know the home position where it has to be electrically controlled to stop at S1 in FIG. 15. Any other suitable means such as a limit switch or a stopper may alternatively be employed to more simply and rather mechanically detect the end point to stop the motor 45.

However, the system for returning the apparatus to its home position as in the example described above is more preferable because the transporting device 43 can be controlled easily to travel either in a forward direction or in a reverse direction. This feature results from the facts that the travel direction of the device 43 depends only upon the rotational direction of the roller 2 and that only the change in position of the cam 38 decides whether this device will be raised or lowered. In short, the transverse transporting device 43 can be driven vertically, whichever direction, forward or reverse, is normal for the rotation of motor-installed roller 2.

The alternative and rather mechanical means such as the limit switch or stopper for sensing the end point may possibly act as an obstacle hindering the roller 2 from rotating in a reverse direction.

Figure 17:
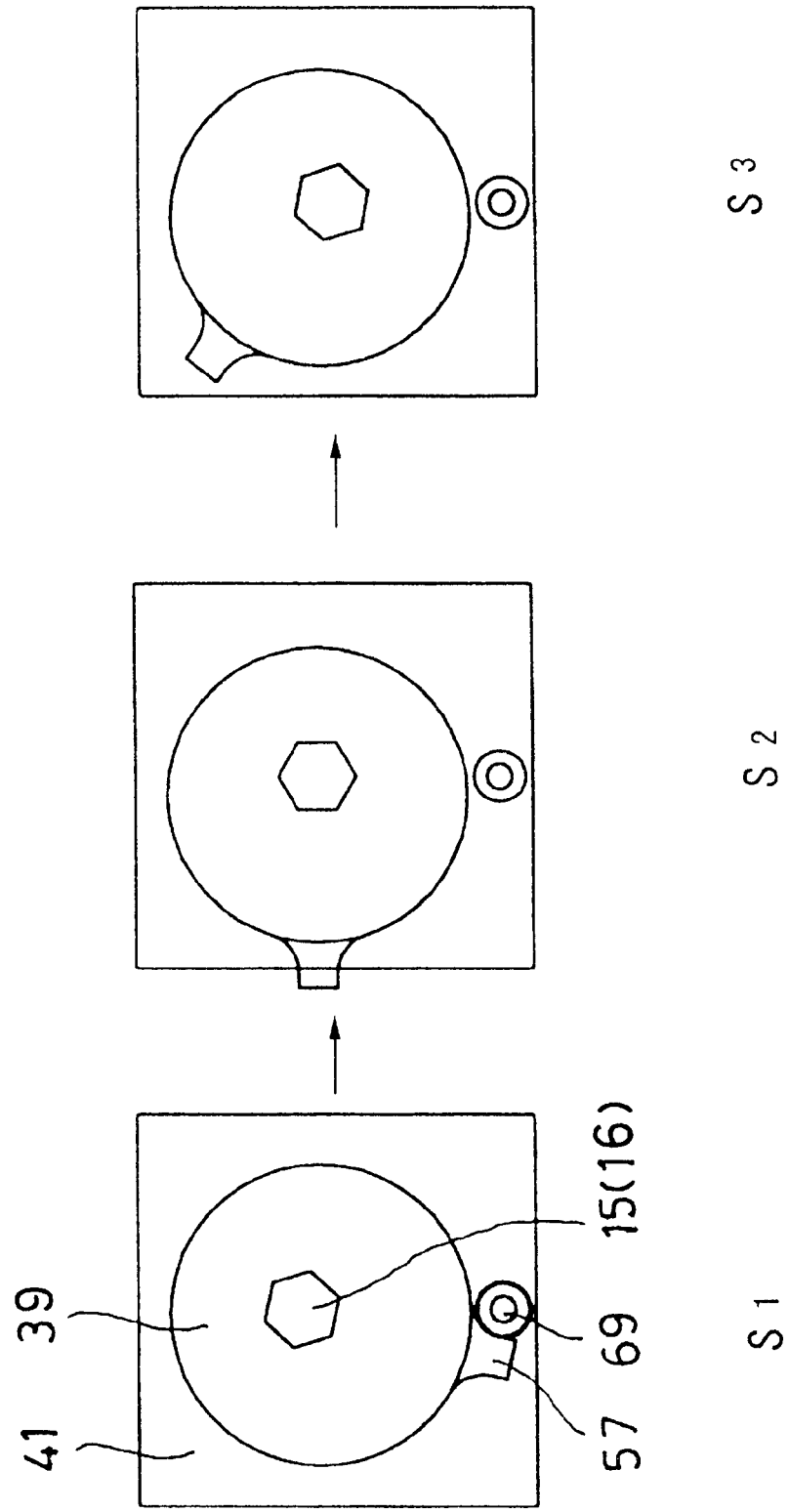
FIG. 17 is a scheme illustrating the reverse motion of the conveying apparatus of FIG. 4, and likewise showing the relationship in position between the members as in FIG. 16.

In contrast with such an alternative case, FIG. 17 showing the preferable example of this invention will make it apparent that no obstacle is present in the rotation locus of the stopping plate 39 until its lug 57 comes into contact with the stopper 69. Therefore, this example is advantageous in that its transporting device 43 may be designed to operate sideways in one direction or in the other direction opposite thereto, at its lifted active position, so as to discharge the article rightwards or leftwards.

Although in the illustrated embodiment the motor-installed cylindrical device has the speed reducer built therein, such a reducer can be dispensed with in the present invention.

It will now be apparent that in the first embodiment all the principal parts of the conveying apparatus of the present invention are covered with the endless member, whereby the apparatus is now effectively rendered compact and adapted for installation in any desired space.

The variable distance between the terminal member and the spinning drive member is effective to keep constant the tension of endless member, without being affected by the ascending and descending motion of the flat support.

The braking or resisting means employed herein is effective to simplify the structure of the present apparatus, since the shaft extending through the motor-installed cylindrical device can be brought into motion merely by stopping the casing thereof.

In the second embodiment, all the principal parts of the conveying apparatus of the present invention are covered with the endless member, whereby the apparatus is now effectively rendered compact and adapted for installation in any desired space.

The roller conveyor system also provided herein is not only useful in unloading the conveyor line of articles in a transverse direction, but also in loading sideways the conveyor line with the articles.

What is claimed is:

1. A conveying apparatus comprising:
    a motor-installed device comprising a casing, a motor accommodated in the casing and a shaft;
    the casing being capable of rotating relative to and about the shaft;
    the shaft being capable of rotating about a rotation axis so as to produce a torque;
    at least one cam fixed on the casing;
    an endless member;
    a drive member for driving the endless member;
    a terminal member disposed opposite to the drive member;
    a deflector for converting the rotation axis to a transverse axis for the drive member, with the transverse axis extending crosswise to the rotation axis so as to transmit the torque to the drive member;
    the drive member and the terminal member being spanned with the endless member that substantially encloses the motor-installed device; and
    a support that is interposed between the casing and the endless member so as to be capable of contacting both the at least one cam and the endless member,
    wherein when the shaft rotates relative to the casing standing stationary, the torque is applied to the drive member so as to cause the endless member to travel in a circulating manner, and when the casing rotates together with the cam relative to the shaft standing still, the cam raises or lowers the support so as to expand outwards or retract inwards a portion of the endless member.

2. A conveying apparatus as defined in claim 1, wherein the endless member is a flexible member selected from the group consisting of a belt and a chain, and both the drive member and the terminal member are parts selected from the groups consisting of pulleys and sprockets.

3. A conveying apparatus as defined in claim 1, wherein the terminal member is capable of displacement towards and away from the drive member.

4. A conveying apparatus as defined in claim 1, further comprising a braking means for forcing the casing not to spin but to stand still, so that the endless member starts to travel in a circulating manner upon stoppage of the casing braked by said means.

5. A conveying apparatus as defined in claim 1, wherein the motor-installed device is a motor-installed cylinder, wherein the casing is a cylindrical casing, wherein a speed reducer accompanying the motor is further accommodated in the casing, and wherein at least one end of the shaft protrudes outwards from at least one end of the casing.

6. A conveying apparatus comprising:
    a motor-installed device having a casing, a motor accommodated in the casing and a shaft;
    both the casing and the shaft being capable of rotating relative to each other and about a rotational axis;
    a deflecting mechanism for converting the rotational axis to a further rotational axis
    a power inputting means;
    a transverse transporting device;
    a lifting means;
    the transporting device designed to transport an article axially of the motor-installed device when and while the power inputting means is energized to rotate; and
    the lifting means for raising and lowering the transporting device being capable of being selectively and operatively connected to one of the casing and the shaft of said device, with the other of the casing and the shaft of said device being simultaneously connected through the deflecting mechanism to the power inputting means, wherein, when said one of the casing and the shaft of said motor-installed device is turned on to rotate, the lifting means will be driven to raise or lower the transporting device, and wherein, with the other of the casing and the shaft of said device being turned on to rotate, the transporting device will be activated by the power inputting means through the deflecting mechanism so as to transport the article.

7. A conveying apparatus as defined in claim 6, wherein the conveying apparatus has a resisting member or members working against rotation either or both of the casing and the shaft.

8. A conveying apparatus as defined in claim 6, wherein the conveying apparatus has both the casing-resisting and shaft-resisting members that work against the casing and the shaft, respectively, such that one of such resisting members always applies a resistance to rotation of the casing or shaft, while the shaft or casing being resisted by the other resisting member temporarily and only under certain conditions.

9. A conveying apparatus as defined in claim 7, wherein the casing-resisting member is urged by an elastic member towards casing.

10. A conveying apparatus as defined in claim 9, wherein the elastic member is a spring.

11. A conveying apparatus as defined in claim 6, wherein the lifting means comprises a cam.

12. A conveying apparatus as defined in claim 11, wherein the cam is operatively connected to the shaft of the motor-installed device and guided to be movable only in a horizontal direction, so that the shaft is moved by the cam in a vertical direction so as to raise and lower the transverse transporting device.

13. A conveying apparatus as defined in claim 12, wherein the cam is supported in place by a slider that is movable only in the horizontal direction.

14. A conveying apparatus as defined in claim 6, wherein the deflecting mechanism comprises a crossed belt.

15. A conveying apparatus as defined in claim 6, wherein the transverse transporting device comprises a plurality of rotatable members rotating synchronously with each other, with at least one of the rotatable members functioning as the power-inputting means.

16. A conveying apparatus as defined in claim 6, wherein the motor-installed device is a motor-installed cylinder, wherein the casing is a cylindrical casing, wherein a speed reducer accompanying the motor is further accommodated in the casing, and wherein at least one end of the shaft protrudes outwards from at least one end of the casing.

17. A conveying apparatus comprising:
a motor-installed device having a casing, a motor accommodated in the casing and a shaft;
the casing and the shaft being capable of rotating relative to each other and about a rotational axis;
a cam;
a deflecting mechanism for converting the rotational axis to a further rotational axis;
a power-inputting means;
a transverse transporting device for transporting an article axially of the motor-installed device when and while the power inputting means is energized to rotate;
a casing-resisting member for always resisting against the casing; and
a shaft-resisting member for temporarily resisting the shaft when the shaft is at its given angular position, wherein the cam is in an operative connection with the shaft in the motor-installed device, with the casing thereof being operatively connected to the power-inputting means through the deflecting mechanism, so that by energizing the motor, the cam will rotate along with the shaft to raise and lower the transporting device, and wherein at the given angular position of the shaft, the shaft-resisting member will impart resistance to this shaft so as to force the casing into rotation against the casing-resisting member and to thereby cause a transporting movement of the transporting device due to a power transmitted through the deflection mechanism and power-inputting means.

18. A conveying apparatus as defined in claim 17, wherein the deflecting mechanism comprises a crossed belt.

19. A conveying apparatus as defined in claim 17, wherein the cam is supported in place by a slider that is movable only in the horizontal direction.

20. A conveying apparatus as defined in claim 17, wherein the motor-installed device is a motor-installed cylinder, wherein the casing is a cylindrical casing, wherein a speed reducer accompanying the motor is further accommodated in the casing, and wherein at least one end of the shaft protrudes outwards from at least one end of the casing.

21. A roller conveyor system comprising a plurality of rotatable conveyor rollers disposed in parallel with each other and the conveying apparatus as defined in claim 6, wherein this apparatus is interposed between the two adjacent conveyor rollers.

22. A roller conveyor system comprising a plurality of rotatable conveyor rollers disposed in parallel with each other and the conveying apparatus as defined in claim 17, wherein this apparatus is interposed between the two adjacent conveyor rollers.

23. A roller conveyor system comprising; a main conveyor line with a plurality of rotatable conveyor rollers disposed in parallel with each other to transport articles in a first path; a branch line with a plurality of rotatable conveyor rollers and diverging from the main conveyor line at a junction; and a first conveying apparatus interposed between two adjacent conveyor rollers on the main conveyor line, the first conveying apparatus being driven by an independent power source to ascend and descend between the two conveyor rollers so as to transport an article on the conveyor rollers on the main conveyor line in a direction transverse the first path onto the conveyor rollers on the branch line, there being equal spaces between adjacent rollers along the main conveyor line, wherein there is a second conveying apparatus between adjacent conveyor rollers on the main conveyor line at the junction to transport an article on the main conveyor line transverse to the first path, the second conveying apparatus driven to ascend and descend independently of the first conveying apparatus, the space between the two conveyor rollers being substantially the same as another space between third and fourth adjacent conveyor rollers on the main conveyor line at which no conveying apparatus is provided to ascend and descend between the third and fourth conveyor rollers.

24. A conveyor assembly comprising a plurality of conveyor units arranged in series and the conveying apparatus as defined in claim 6, wherein this apparatus is disposed in between the two adjacent conveyor units.

25. A conveyor assembly comprising a plurality of conveyor units arranged in series and the conveying apparatus as defined in claim 17, wherein this apparatus is disposed in between the two adjacent conveyor units.

* * * * *